United States Patent
Liu et al.

(10) Patent No.: US 9,756,676 B2
(45) Date of Patent: Sep. 5, 2017

(54) BASE STATION, DEVICE TO DEVICE USER EQUIPMENT, TRANSMISSION METHOD, REPORT METHOD AND RESOURCE ADJUSTMENT METHOD FOR WIRELESS COMMUNICATION SYSTEM

(71) Applicant: Institute For Information Industry, Taipei (TW)

(72) Inventors: Shu-Tsz Liu, Taipei (TW); Chun-Che Chien, Taipei (TW); Hsien-Tsung Hsu, Taipei (TW)

(73) Assignee: Institute For Information Industry, Taipei (TW)

( * ) Notice: Subject to any disclaimer, the term of this patent is extended or adjusted under 35 U.S.C. 154(b) by 106 days.

(21) Appl. No.: 14/706,944

(22) Filed: May 7, 2015

(65) Prior Publication Data

US 2015/0327314 A1  Nov. 12, 2015

Related U.S. Application Data

(60) Provisional application No. 61/991,444, filed on May 9, 2014.

(51) Int. Cl.
*H04W 76/02* (2009.01)
*H04W 76/04* (2009.01)
(Continued)

(52) U.S. Cl.
CPC ....... *H04W 76/04* (2013.01); *H04W 72/0406* (2013.01); *H04W 76/021* (2013.01);
(Continued)

(58) Field of Classification Search
CPC ............... H04W 76/04; H04W 76/023; H04W 72/0406; H04W 76/021; H04W 88/02; H04W 88/08; H04W 84/18
See application file for complete search history.

(56) References Cited

U.S. PATENT DOCUMENTS

2011/0258327 A1* 10/2011 Phan ............... H04W 16/10
709/227
2011/0312331 A1  12/2011 Hakola et al.
(Continued)

FOREIGN PATENT DOCUMENTS

TW   201345278 A   11/2013
WO   2014070101 A1   5/2014

OTHER PUBLICATIONS

Office Action to the corresponding Taiwan Patent Application No. 104114124 rendered by the Taiwan Intellectual Property Office (TIPO) on Aug. 12, 2016, 12 pages.

*Primary Examiner* — Jay P Patel
(74) *Attorney, Agent, or Firm* — Skaar Ulbrich Macari, P.A.

(57) ABSTRACT

A base station and a device to device (D2D) user equipment (UE), a transmission method, a report method and a resource adjustment method for a wireless communication system are provided. When the D2D UE operates as a transmitting end, it is able to determine a transmission mode according to a transmission condition (e.g., whether a radio link failure or a collision occurs when a D2D transmission is being performed, or whether the telecommunication operators of the transmitting end and the corresponding receiving end are the same). When the D2D UE operates as a receiving end, it is able to transmit a report message carrying received signal quality to the base station after receiving D2D data. Accordingly, the base station is able to adjust a D2D resource configuration according to the report message.

19 Claims, 18 Drawing Sheets

(51) Int. Cl.
  *H04W 72/04*    (2009.01)
  *H04W 88/02*    (2009.01)
  *H04W 88/08*    (2009.01)
  *H04W 84/18*    (2009.01)

(52) U.S. Cl.
  CPC .......... *H04W 76/023* (2013.01); *H04W 84/18* (2013.01); *H04W 88/02* (2013.01); *H04W 88/08* (2013.01)

(56) References Cited

U.S. PATENT DOCUMENTS

| | | | |
|---|---|---|---|
| 2012/0243431 A1* | 9/2012 | Chen | H04W 72/0406 370/252 |
| 2012/0322484 A1 | 12/2012 | Yu et al. | |
| 2013/0208587 A1 | 8/2013 | Bala et al. | |
| 2015/0119056 A1* | 4/2015 | Lee | H04W 48/00 455/450 |
| 2015/0201392 A1* | 7/2015 | Sartori | H04W 60/00 370/329 |
| 2015/0215981 A1* | 7/2015 | Patil | H04W 76/023 370/329 |
| 2015/0245334 A1* | 8/2015 | Chang | H04W 72/02 370/329 |
| 2015/0271763 A1* | 9/2015 | Balachandran | H04W 52/245 370/338 |
| 2015/0334757 A1* | 11/2015 | Seo | H04W 76/023 370/329 |
| 2016/0050702 A1* | 2/2016 | Sorrentino | H04W 56/0025 370/329 |
| 2016/0219394 A1* | 7/2016 | Van Phan | H04W 72/0453 |
| 2017/0064736 A1* | 3/2017 | Yu | H04W 72/14 |

\* cited by examiner

BASE STATION, DEVICE TO DEVICE USER EQUIPMENT, TRANSMISSION METHOD, REPORT METHOD AND RESOURCE ADJUSTMENT METHOD FOR WIRELESS COMMUNICATION SYSTEM

PRIORITY

This application claims the benefit of priority of U.S. Provisional Application Ser. No. 61/991,444, filed May 9, 2014, which is hereby incorporated by reference in its entirety herein.

FIELD

The present invention relates to a base station, a device to device (D2D) user equipment (UE), a transmission method, a report method and a resource adjustment method for a wireless communication system. More particularly, the D2D UE of the present invention can, when operating as a transmitting end, decide a transmission mode according to a transmission condition and, when operating as a receiving end, can transmit a report message to a base station so that the base station adjusts a D2D resource configuration according to the report message.

BACKGROUND

As a result of advancement of the wireless communication technologies in recent years, many kinds of wireless communication systems have been derived and applied to various circumstances. For example, in order to provide emergency communication services (e.g., to call the police, the fire station or the ambulance) or inter-group communication services in the public safety network framework, there is a need for direct communication between neighboring UEs to make communications therebetween more efficient.

According to the $3^{rd}$ Generation Partnership Project Long Term Evolution (3GPP LTE) communication system specification, a device to device (D2D) UE within signal coverage of a base station can perform D2D data transmission with other D2D UEs by requesting a specific radio resource from the base station or by being informed of a radio resource that it can contend for. However, the 3GPP LTE communication system specification currently available does not plan for various scenarios that the D2D UE experiences (e.g., when the D2D UE is in a region having a poor signal strength) so as to provide a resource configuration adjustment or transmission mode adjustment mechanism.

Accordingly, an urgent need exists in the art to provide a resource configuration adjustment or transmission mode adjustment mechanism that allows a D2D UE to dynamically adjust the transmission mode automatically and allows a base station to dynamically adjust the resource configuration or to instruct the D2D UE to adjust the transmission mode.

SUMMARY

An objective of the present invention includes providing a resource configuration adjustment or transmission mode adjustment mechanism. With the transmission mode adjustment mechanism of the present invention, a D2D UE can decide a transmission mode according to a transmission condition when operating as a transmitting end. With the resource configuration adjustment and transmission mode adjustment mechanism, when the D2D UE operates as a receiving end, the D2D UE can transmit a report message carrying a received signal quality to the base station so that the base station adjusts the D2D resource configuration or adjusts the transmission mode of the corresponding transmitting end according to the report message.

Disclosed is a device to device (D2D) user equipment (UE) for a wireless communication system. The D2D UE comprises a storage, a transceiver and a processor. The storage is configured to store a piece of first transmission mode information and a piece of second transmission mode information. The first transmission mode information indicates a first transmission mode resource and the second transmission mode information indicates a second transmission mode resource. The processor is electrically connected to the storage and the transceiver, and is configured to execute the following operations when the D2D UE operates as a transmitting end: utilizing the first transmission mode resource to perform a D2D data transmission via the transceiver in a first transmission mode; determining whether a radio link failure (RLF) occurs between the D2D UE and a base station; and utilizing the first transmission mode resource and the second transmission mode resource to perform the D2D data transmission via the transceiver when the RLF occurs between the D2D UE and the base station.

Further disclosed is a transmission method for use in a D2D UE. The D2D UE operates as a transmitting end and comprises a storage, a transceiver and a processor. The storage stores a piece of first transmission mode information and a piece of second transmission mode information. The first transmission mode information indicates a first transmission mode resource, and the second transmission mode information indicates a second transmission mode resource. The processor is electrically connected to the storage and the transceiver. The D2D data transmission method is executed by the processor and comprises the following steps of: utilizing the first transmission mode resource to perform a D2D data transmission via the transceiver in a first transmission mode; determining whether an RLF occurs between the D2D UE and a base station; and utilizing the first transmission mode resource and the second transmission mode resource to perform the D2D data transmission via the transceiver when the RLF occurs between the D2D UE and the base station.

Also, disclosed is a base station for a wireless communication system. The base station comprises a transceiver, a storage and a processor. The storage is configured to store a D2D resource configuration. The processor is electrically connected to the storage and the transceiver, and is configured to execute the following operations: receiving a plurality of first report messages from a plurality of receiving ends via the transceiver, each of the first report messages indicating a first received signal quality of one of the receiving ends, and each of the receiving ends being a D2D UE; evaluating a first configuration result of the D2D resource configuration according to the first received signal qualities; determining whether the first configuration result is consistent with an expected result; and adjusting the D2D resource configuration or transmitting a D2D data transmission mode switching message to a transmitting end when the first configuration result is inconsistent with the expected result, wherein the transmitting end is a D2D UE and transmits D2D data to one of the receiving ends.

Further disclosed is a resource adjustment method for a base station. The base station comprises a storage, a transceiver and a processor. The storage is configured to store a D2D resource configuration. The processor is electrically connected to the storage and the transceiver. The resource adjustment method is executed by the processor and comprises the following steps of: receiving a plurality of first report messages from a plurality of receiving ends via the transceiver, each of the first report messages indicating a first received signal quality of one of the receiving ends, and each of the receiving ends being a D2D UE; evaluating a first configuration result of the D2D resource configuration according to the first receiving signal qualities; determining whether the first configuration result is consistent with an expected result; and adjusting the D2D resource configuration or transmitting a D2D data transmission mode switching message to a transmitting end when the first configuration result is inconsistent with the expected result, wherein the transmitting end is a D2D UE and transmits a piece of D2D data to one of the receiving ends.

Additionally disclosed is a device to device (D2D) user equipment (UE). The D2D UE comprises a transceiver and a processor. The processor is electrically connected to the transceiver. The processor is configured to execute the following operations when the D2D UE operates as a receiving end: receiving D2D data from a transmitting end via the transceiver, wherein the transmitting end is another D2D UE; and measuring a received signal quality of the D2D data and generating a report message according to the received signal quality to transmit the report message to a base station via the transceiver.

The disclosure further includes a report method for use in a D2D UE. The D2D UE operates as a receiving end and comprises a transceiver and a processor. The processor is electrically connected to the transceiver. The report method is executed by the processor and comprises the following steps of: receiving D2D data from a transmitting end via the transceiver, wherein the transmitting end is another UE; measuring a received signal quality of the D2D data and generating a report signal according to the received signal quality; and transmitting the report message to a base station via the transceiver.

Disclosed is a device to device (D2D) user equipment (UE). The D2D UE comprises a transceiver and a processor. The processor is electrically connected to the transceiver. The processor is configured to execute the following operations when the D2D UE operates as a transmitting end: receiving a piece of first transmission mode information and a piece of second transmission mode information from a base station via the transceiver, the first transmission mode information indicating a first transmission mode resource and the second transmission mode information indicating a second transmission mode resource; and selecting one of the first transmission mode resource and the second transmission mode resource to transmit D2D data to another D2D UE via the transceiver.

Also disclosed is a D2D data transmission method for use in a D2D UE. The D2D UE operates as a transmitting end and comprises a transceiver and a processor. The processor is electrically connected to the transceiver. The D2D data transmission method is executed by the processor and comprises the following steps of: receiving a piece of first transmission mode information and a piece of second transmission mode information from a base station via the transceiver, the first transmission mode information indicating a first transmission mode resource and the second transmission mode information indicating a second transmission mode resource; and selecting one of the first transmission mode resource and the second transmission mode resource to transmit D2D data to another D2D UE via the transceiver.

The detailed technology and preferred embodiments implemented for the subject invention are described in the following paragraphs accompanying the appended drawings for people skilled in this field to well appreciate the features of the claimed invention.

DETAILED DESCRIPTION

The invention will now be explained with reference to certain example embodiments thereof. However, these example embodiments are not intended to limit the present invention to any specific examples, embodiments, environment, applications or particular implementations described in these example embodiments. Therefore, description of these example embodiments is only for purpose of illustration rather than to limit the present invention, and the scope of this application shall be governed by the claims.

In the following embodiments and the attached drawings, elements unnecessary to explain the invention are omitted from depiction; and dimensional relationships among individual elements in the attached drawings are illustrated only for ease of understanding, but not to limit the actual scale.

Figure 1:
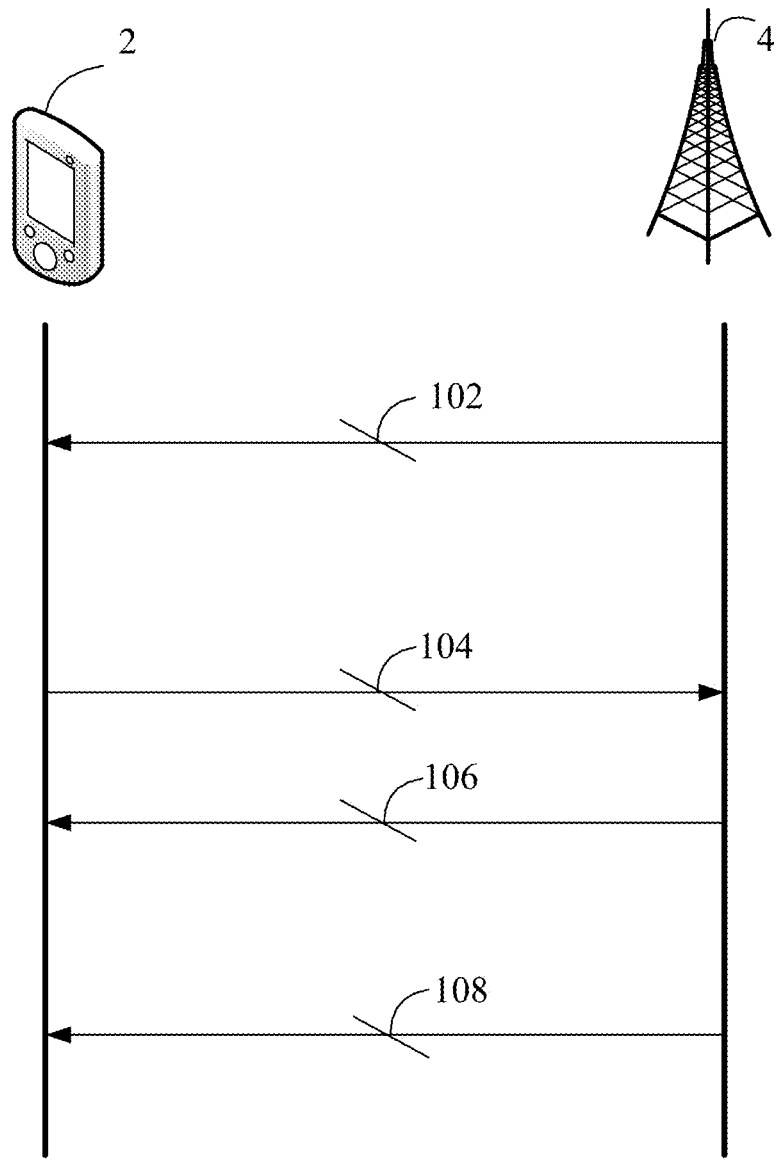
FIG. 1 is a schematic view depicting message transmissions between a D2D UE 2 and a base station 4 according to the present invention.
Figure 2A:
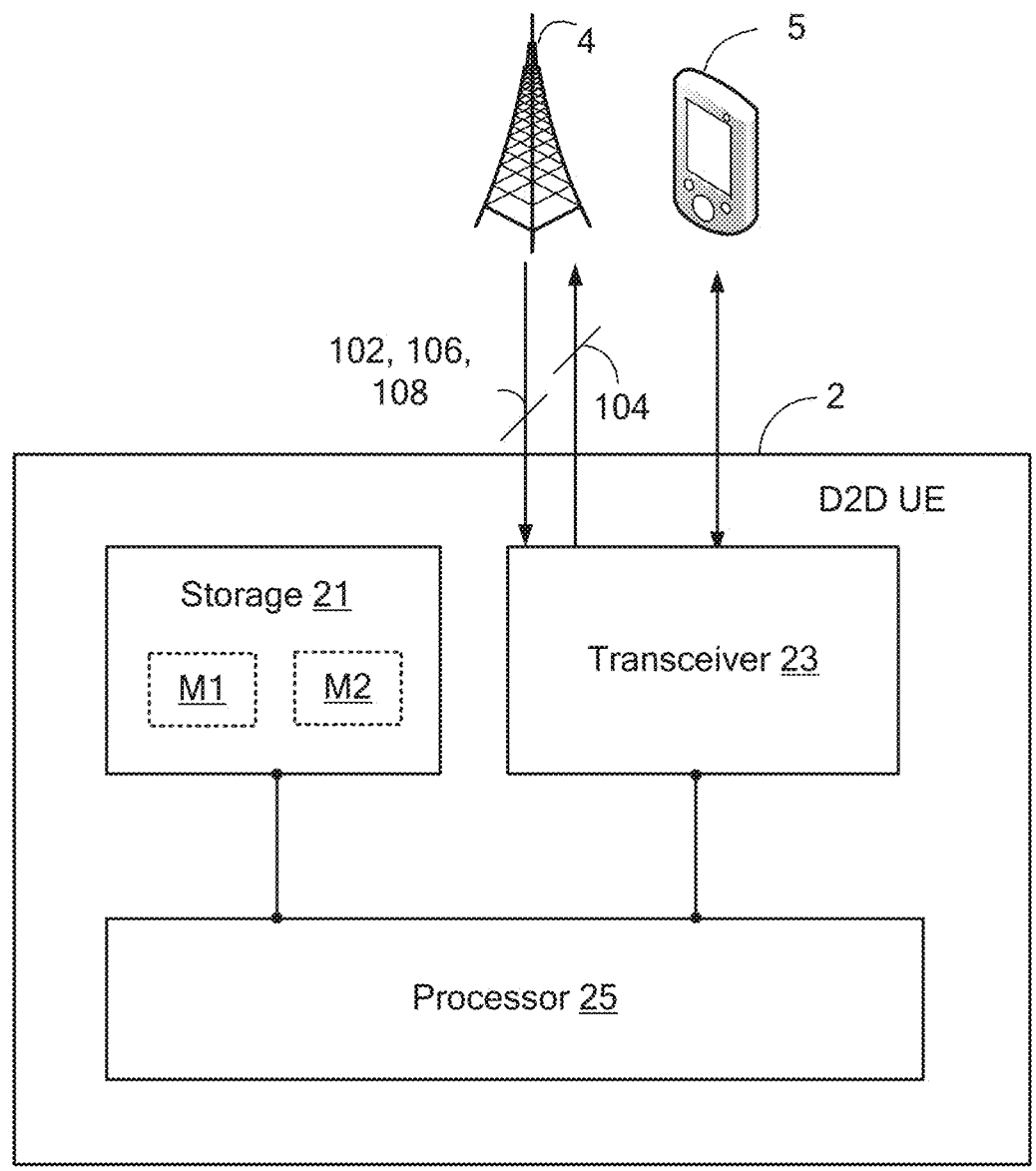
FIG. 2A is a schematic view of the D2D UE 2 according to a first to a fifth embodiment of the present invention.
Figure 2B:
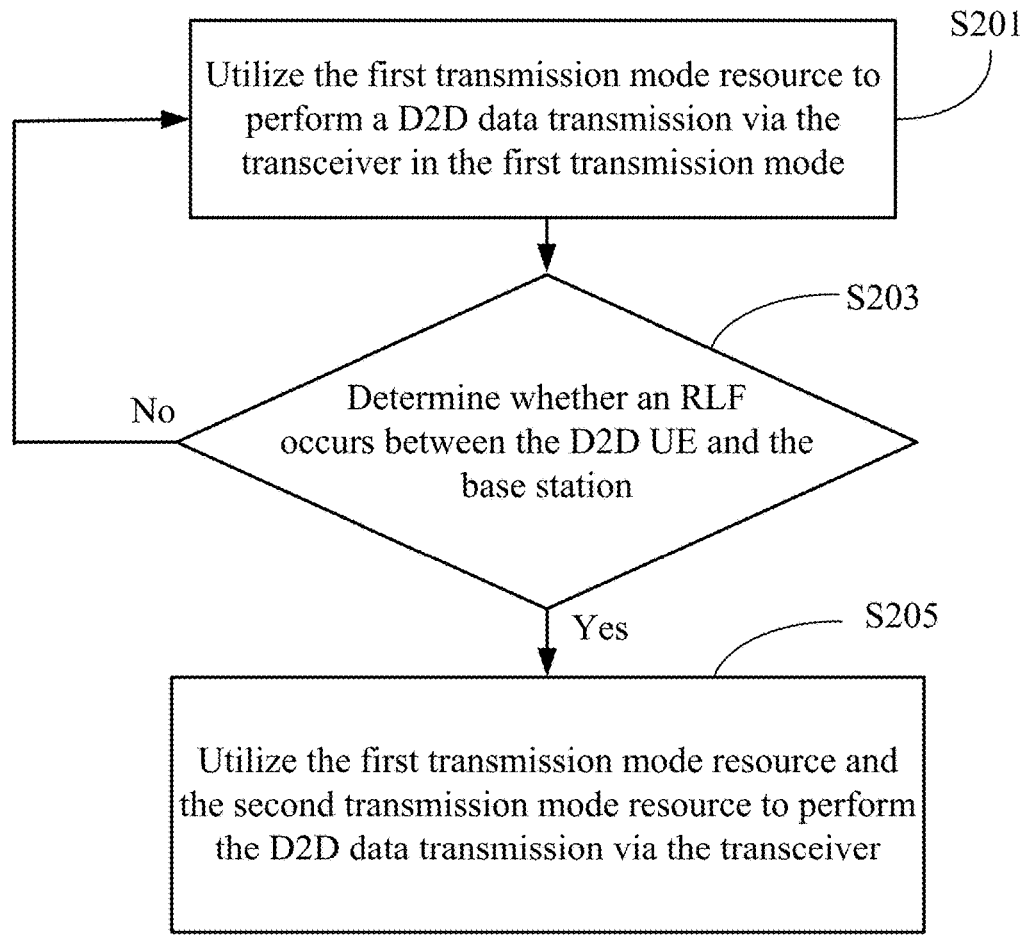
FIG. 2B is a flowchart diagram of a transmission method according to the first embodiment of the present invention.

Please refer to FIG. 1, FIG. 2A and FIG. 2B for a first embodiment of the present invention. FIG. 1 is a schematic view depicting message transmissions between a base station 4 and a D2D UE 2 according to the present invention. FIG. 2A is a schematic view of the D2D UE 2 according to the present invention. FIG. 2B is a flowchart diagram of a transmission method for the D2D UE 2 according to the present invention. In this embodiment, the D2D UE 2 may use a first transmission mode resource and a second transmission mode resource to perform a D2D data transmission depending on specific service scenarios.

The D2D UE 2 is for use in a wireless communication system (e.g., a $3^{rd}$ Generation Partnership Project Long Term Evolution (3GPP LTE) communication system), and can perform direct communication (i.e., D2D data transmission) with other D2D UEs. For example, the D2D UE 2 may be a smartphone, a tablet computer or some other equipment compatible with the 3GPP LTE communication system and having a direct communication function. The D2D UE 2 comprises a storage 21, a transceiver 23 and a processor 25. The storage 21 is configured to store a piece of first transmission mode information M1 and a piece of second transmission mode information M2. It shall be appreciated that, the first transmission mode information M1 is configured to indicate a first transmission mode resource, and the second transmission mode information M2 is configured to indicate a second transmission mode resource. Additionally in an implementation, the first transmission mode resource may be a licensed band resource, and the second transmission mode resource may be an unlicensed band resource, although they are not limited thereto.

In detail, the first transmission mode resource and the second transmission mode resource in this embodiment are just as defined in the 3GPP Specification 36.843. The first transmission mode resource is a specific resource scheduled by the base station 4 for specific D2D UEs, and the second transmission mode resource is a pre-configured and/or quasi-statically configured resource pool which allows a plurality of D2D UEs to contend for D2D data transmissions.

Specifically, as shown in FIG. 1, the base station 4 can transmit a broadcasting message 102 carrying the second transmission mode information M2 to all D2D UEs within the signal coverage thereof through broadcasting. For example, the broadcasting message 102 may be a system information block (SIB) message. Then, each D2D UE can contend for the second transmission mode resource to perform D2D data transmissions with other D2D UEs according to the second transmission mode resource indicated by the second transmission mode information M2.

On the other hand, the D2D UE 2 may also transmit a request message 104 to the base station 4 so that the base station 4 schedules a specific D2D resource block for the D2D UE 2 according to the D2D resource requested by the D2D UE 2 in the request message 104 and transmits a resource configuration message 106 carrying the first transmission mode information M1 back to the D2D UE 2. In this way, the D2D UE 2 can use the specific resource (i.e., the first transmission mode resource) scheduled by the base station 4 to perform D2D data transmission according to the first transmission mode resource indicated by the first transmission mode information M1. In other words, the first transmission mode resource of this embodiment refers to a resource scheduled by the base station 4 according to the D2D resource requested by the UEs, and the second transmission mode resource refers to a pre-configured and/or quasi-statically configured D2D resource notified by the base station 4 through broadcasting.

It is assumed in this embodiment that, in normal conditions of the radio link between the D2D UE 2 and the base station 4, the D2D UE 2 preferentially operates in the first transmission mode, i.e., preferentially utilizes the first transmission mode resource to perform a D2D data transmission. In other words, the D2D UE 2 performs the D2D data transmission with the base station 4 in the first transmission mode when the link between the D2D UE 2 and the base station 4 is in a stable state. As shown in FIG. 2A, the processor 25 is electrically connected to the storage 21 and the transceiver 23. When the D2D UE 2 operates as a transmitting end, the processor 25 executes a transmission method shown in FIG. 2B.

Firstly, step S201 is executed by the processor 25 to utilize the first transmission mode resource to perform a D2D data transmission via the transceiver 23 in the first transmission mode. Next, step S203 is executed by the processor 25 to determine whether a radio link failure (RLF) occurs between the D2D UE 2 and the base station 4. For example, if the synchronization signal transmitted by the base station 4 cannot be received by the D2D UE 2, the processor 25 determines that an RLF occurs between the D2D UE 2 and the base station 4.

If it is determined that the RLF occurs between the D2D UE 2 and the base station 4, step S205 is executed by the processor 25 to utilize the first transmission mode resource and the second transmission mode resource to perform the D2D data transmission via the transceiver 23. Conversely, if no RLF occurs between the D2D UE 2 and the base station 4, step S201 is executed again by the processor 25 to still utilize the first transmission mode resource to perform a D2D data transmission via the transceiver 23 in the first transmission mode. In other words, the D2D UE 2 determines a resource to be used depending on the link condition between the D2D UE 2 and the base station 4 in this embodiment. The D2D UE 2 utilizes the first transmission mode resource and the second transmission mode resource to perform the D2D data transmission when an RLF occurs, and utilizes the first transmission mode resource to perform D2D data transmission when the link between the D2D UE 2 and the base station 4 is in a stable state. Therefore, in case of an RLF, the D2D UE 2 of the present invention can support a resource scheduled centrally by the base station (i.e., the first transmission mode resource) and a resource used for UE distributed communication (i.e., the second transmission mode resource) simultaneously, so the utilization efficiency of the resource spectrum can be enhanced.

It shall be noted that, when an RLF occurs between the D2D UE 2 and the base station 4, the D2D UE 2 may decide whether the D2D data is to be transmitted by use of the first transmission mode resource or by use of the second transmission mode resource according to a Quality of Service (QoS) required by the D2D data to be transmitted or according to a Quality of Service class identifier (QCI). For example, if no collision has occurred during the processing of using the first transmission mode resource to transmit D2D data, the D2D UE 2 may continuously use the first transmission mode resource to transmit D2D data requiring a high QCI and do not change into the second transmission mode resource until a collision occurs in the processing of using the first transmission mode resource to transmit the D2D data. In other words, in case of an RLF, the D2D UE 2 may decide by itself whether to utilize both the transmission resources (i.e., the first transmission mode resource and the second transmission mode resource) for transmission of a same D2D data, or to use the first transmission mode resource for transmission of a part of the D2D data and the second transmission mode resource for transmission of the remaining part of the D2D data, or choose to utilize one of the first transmission mode resource and the second transmission mode resource for transmission of the D2D data.

As previously described, the D2D UE 2 knows the first transmission mode resource and the second transmission mode resource from the broadcasting message 102 carrying the second transmission mode information M2 and the resource configuration message 106 carrying the first transmission mode information M1 that are transmitted by the base station 4. Therefore, as shown in FIG. 2A, the processor 25 receives the broadcasting message 102 and the resource configuration message 106 from the base station 4 via the transceiver 23. The broadcasting message 102 carries the second transmission mode information M2, and the resource configuration message 106 carries the first transmission mode information M1. Additionally, the resource configuration message 106 may further carry a piece of second transmission mode resource update information that indicates an updated second transmission mode resource in other embodiments. Accordingly, the processor 25 further updates the second transmission mode information M2 according to the second transmission mode resource update information, and the updated second transmission mode information M2 can be stored in the storage 21. Thereby, when the D2D UE 2 is to use the second transmission mode resource for D2D data transmission, the second transmission mode resource indicated by the updated second transmission mode information M2 is used for the D2D data transmission.

On the other hand, the base station 4 may also transmit a second transmission mode update message 108 to the D2D UE 2 according to the overall resource usage state in other embodiments. Therefore, the processor 25 further receives the second transmission mode update message 108 from the base station 4 via the transceiver 23. Similarly, the second transmission mode update message 108 carries a piece of second transmission mode resource update information, so the processor 25 further updates the second transmission mode information M2 stored in the storage 21 according to the second transmission mode update information.

It shall be noted that, FIG. 1 is only a schematic view depicting messages transmitted between the base station 4 and the D2D UE 2 in the first embodiment of the present invention, but is not intended to limit the time sequence of the broadcasting message 102, the request message 104, the resource configuration message 106 and the second transmission mode update message 108. Therefore, in other implementations, the second transmission mode update message 108 may also show up before the request message 104 and the resource configuration message 106.

Figure 2C:
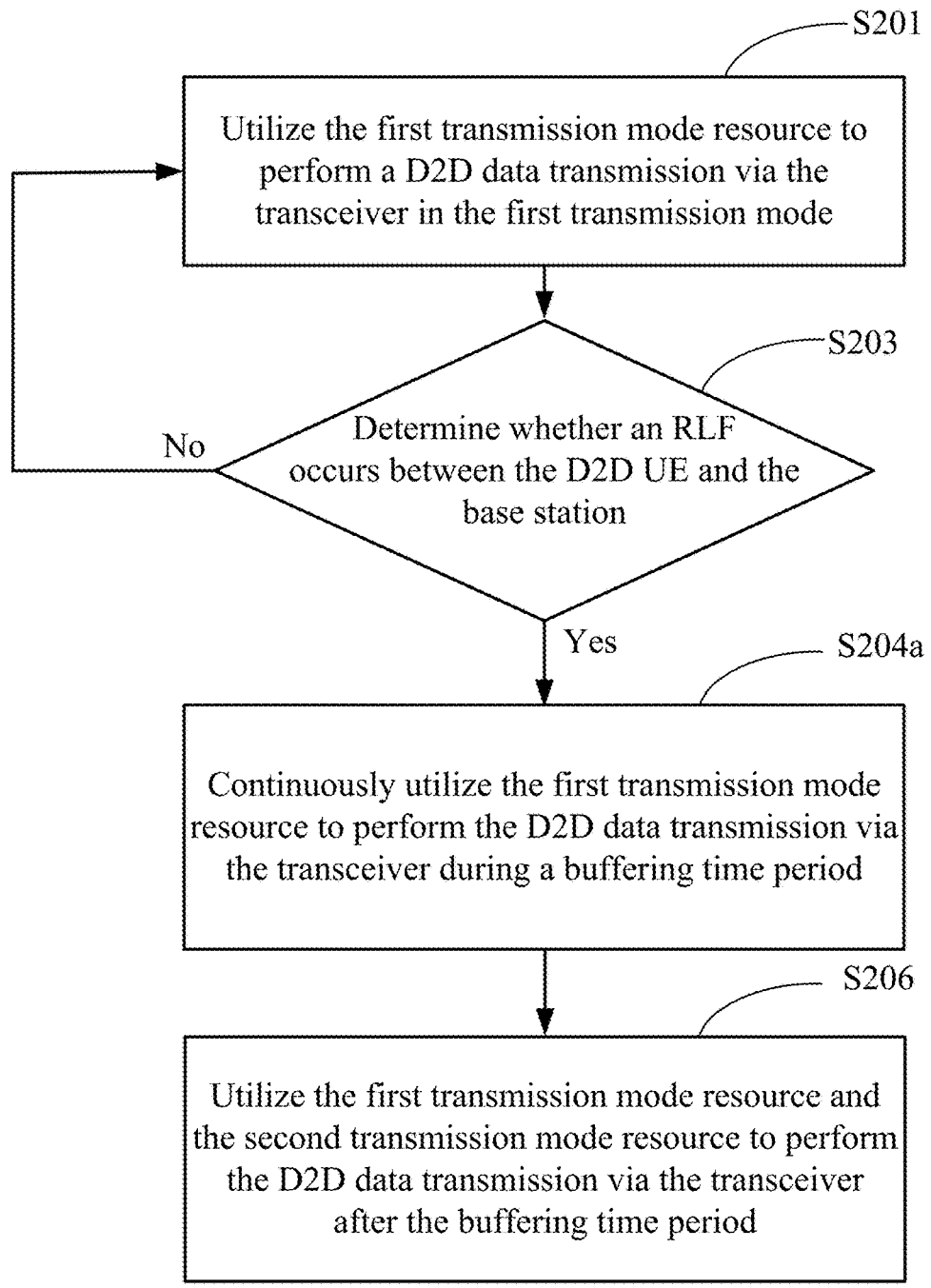
FIG. 2C is a flowchart diagram of a transmission method according to the second embodiment of the present invention.

A second embodiment of the present invention is as shown in FIG. 2A and FIG. 2C, which depict a transmission method for use in the D2D UE 2. This embodiment is an extension of the first embodiment. As shown in FIG. 2A and FIG. 2C, when the processor 25 determines that an RLF occurs between the D2D UE 2 and the base station 4, step S204a is executed to continuously utilize the first transmission mode resource to perform the D2D data transmission via the transceiver 23 during a buffering time period. Thereby, continuity of the D2D data transmission can be maintained. Then, step S206 is executed by the processor 25 to utilize the first transmission mode resource and the second transmission mode resource to perform the D2D data transmission via the transceiver 23 after the buffering time period.

It shall be noted in this embodiment that, when an RLF occurs, the D2D UE 2 continuously utilizes the first transmission mode resource during the buffering time period to maintain continuity of the D2D data transmission firstly and then also tries to utilize the second transmission mode resource so that the processor 25 can utilize the first transmission mode resource and the second transmission mode resource simultaneously for D2D data transmission via the transceiver 23 after the buffering time period. It shall also be noted that, the term "simultaneously" is only used to indicate that both the first transmission mode resource and the second transmission mode resource can be used, but not intended to limit that they are used at the same time.

As an example, the D2D UE 2 may use the first transmission mode resource to transmit important D2D data and use the second transmission mode resource to transmit other D2D data after the buffering time period. Importance of the D2D data may be decided according to the Quality of Service (QoS) or the Quality of Service class identifier (QCI). As another example, the D2D UE may also use the first transmission mode resource and the second transmission mode resource simultaneously to transmit a same D2D data or different D2D data (here, there is no difference in importance of the D2D data).

Figure 2D:
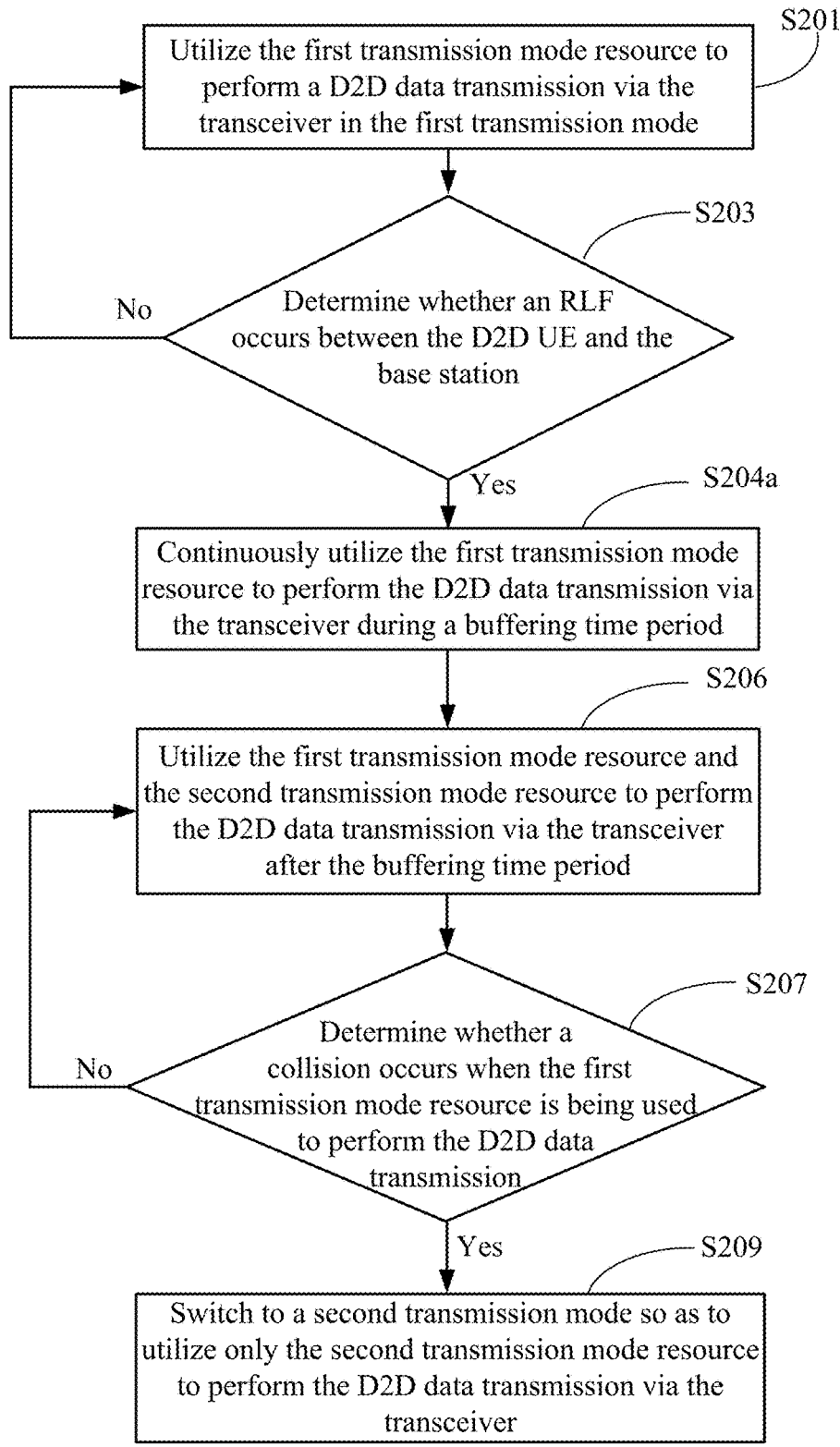
FIG. 2D is a flowchart diagram of a transmission method according to the third embodiment of the present invention.

A third embodiment of the present invention is as shown in FIG. 2A and FIG. 2D, which is an extension of the second embodiment. In this embodiment, step S207 is further executed after the step S206 to determine whether a collision occurs when the first transmission mode resource is being used to perform D2D data transmission. Specifically, the processor 25 may determine whether a collision occurs by detecting whether there is a signal transmission in the first transmission mode resource or according to whether an Acknowledgement message is received by the D2D UE 2 from the receiving end. If it is determined by the processor 25 that a collision has occurred, then step S209 is executed to switch to a second transmission mode so as to utilize only the second transmission mode resource to perform the D2D data transmission via the transceiver 23. If it is determined by the processor 25 that no collision occurs during the process of using the first transmission mode resource to perform the D2D data transmission, then the procedure returns back to the step S206 in which the first transmission mode resource and the second transmission mode resource are used to perform the D2D data transmission via the transceiver 23.

Figure 2E:
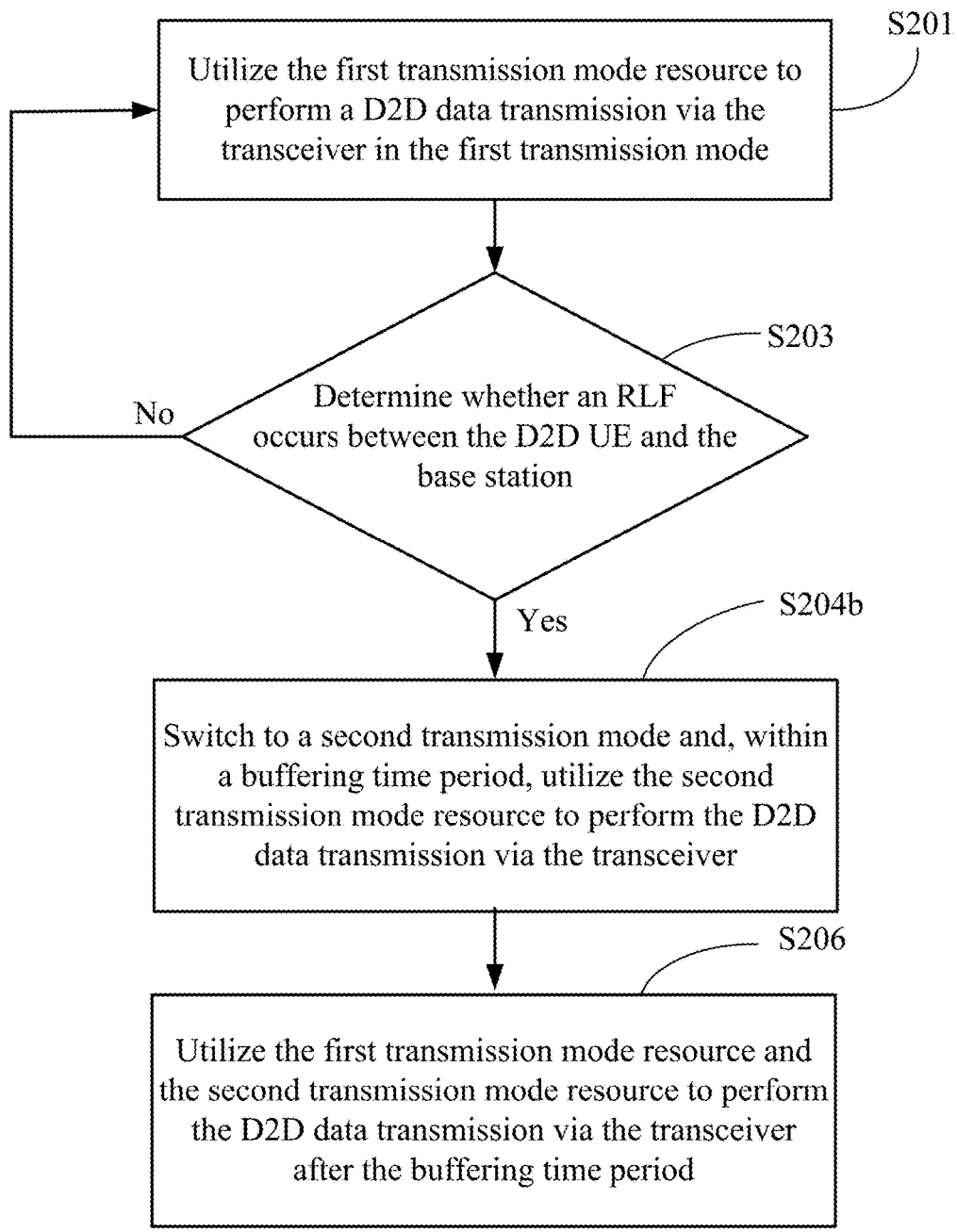
FIG. 2E is a flowchart diagram of a transmission method according to the fourth embodiment of the present invention.

Please refer to FIG. 2A and FIG. 2E together. A fourth embodiment of the present invention is also an extension of the first embodiment. This embodiment differs from the second embodiment in that, when an RLF occurs between the D2D UE 2 and the base station 4, the D2D UE 2 firstly switches to the second transmission mode so that the second transmission mode resource is utilized to perform D2D data transmission. Specifically, as shown in FIG. 2E, when the RLF occurs between the D2D UE 2 and the base station 4, then step S204b is executed to switch to a second transmission mode and, within a buffering time period, use the second transmission mode resource to perform the D2D data transmission via the transceiver 23. Then, step S206 is executed to utilize the first transmission mode resource and the second transmission mode resource to perform the D2D data transmission via the transceiver 23 after the buffering time period. In other words, the fourth embodiment differs from the second embodiment in the steps S204a and S204b; that is, in this embodiment, the processor 25 directly switches to the second transmission mode to transmit the D2D data when an RLF occurs.

Figure 2F:
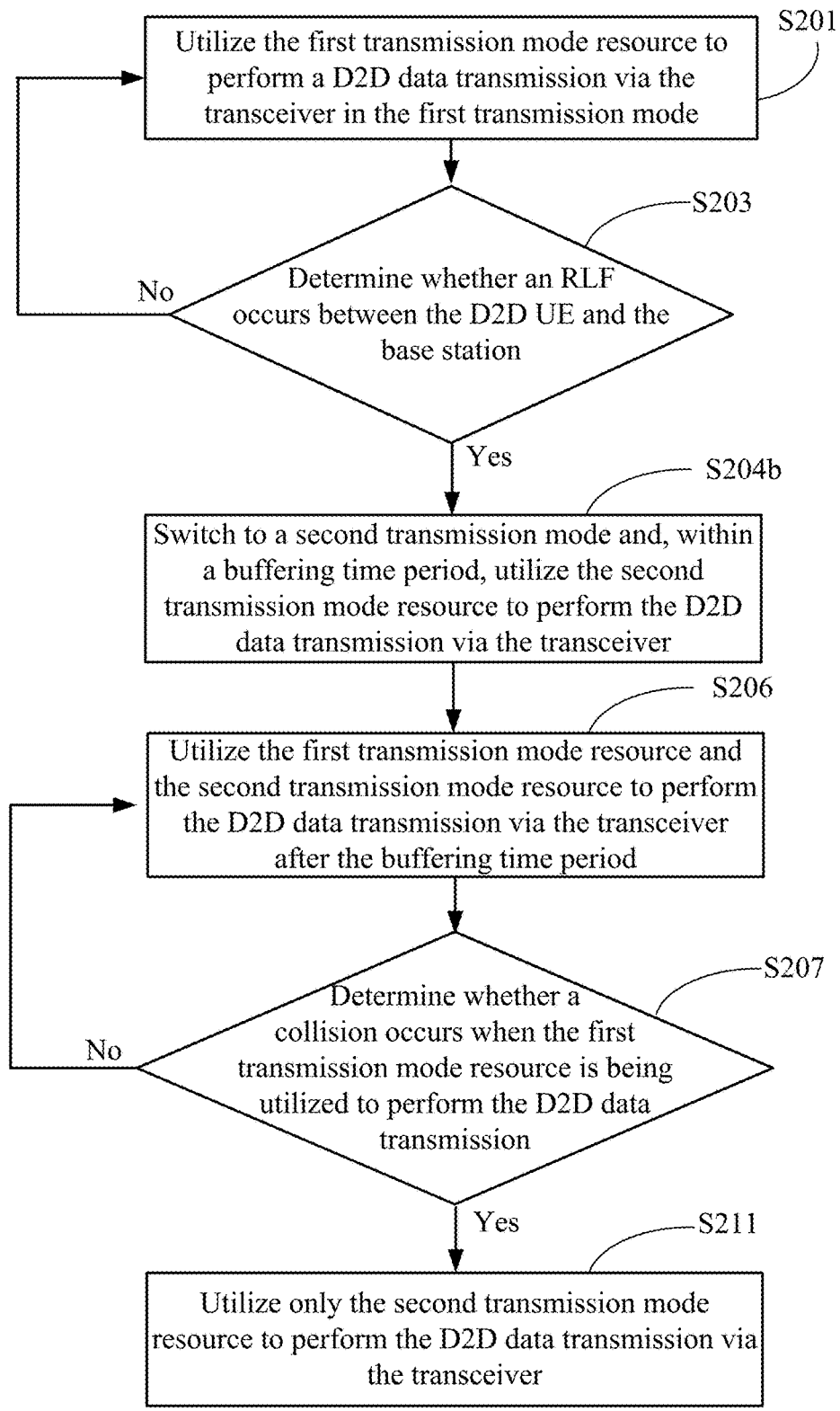
FIG. 2F is a flowchart diagram of a transmission method according to the fifth embodiment of the present invention.

Similarly, a fifth embodiment of the present invention is an extension of the fourth embodiment. As shown in FIG. 2F, the processor 25 of the D2D UE 2 of the present invention further executes step S207 to determine whether a collision occurs when the first transmission mode resource is being utilized to perform the D2D data transmission. If it is determined that a collision occurs, then step S211 is executed to utilize only the second transmission mode resource to perform the D2D data transmission via the transceiver 23 after occurrence of the collision. Otherwise, if no collision occurs, then the procedure returns back to the step S206 in which the first transmission mode resource and the second transmission mode resource are utilized to perform the D2D data transmission via the transceiver 23. With the transmission mechanism of the present invention, even when the resource scheduled by the base station 4 (i.e., the first transmission mode resource) cannot be received by the D2D UE 2 due to an RLF, the D2D UE 2 can still utilize the second transmission mode resource to continue the D2D data transmission. Thereby, the present invention can effectively improve the resource band utilization efficiency so that, even in case of an RLF, the D2D UE can still use the resources to the greatest extent to reduce the possibility of D2D data transmission interruption.

Please refer to FIGS. 3, 4A, 4B, 5A and 5B for a sixth embodiment of the present invention. In this embodiment, the base station 4 can adjust the scheduled resources or switch the transmission modes of the UEs by receiving report messages transmitted back from the UEs. In this way, the resource adjustment method of this embodiment can further improve the resource band utilization efficiency so that the UEs can perform the D2D communication smoother.

Figure 3:
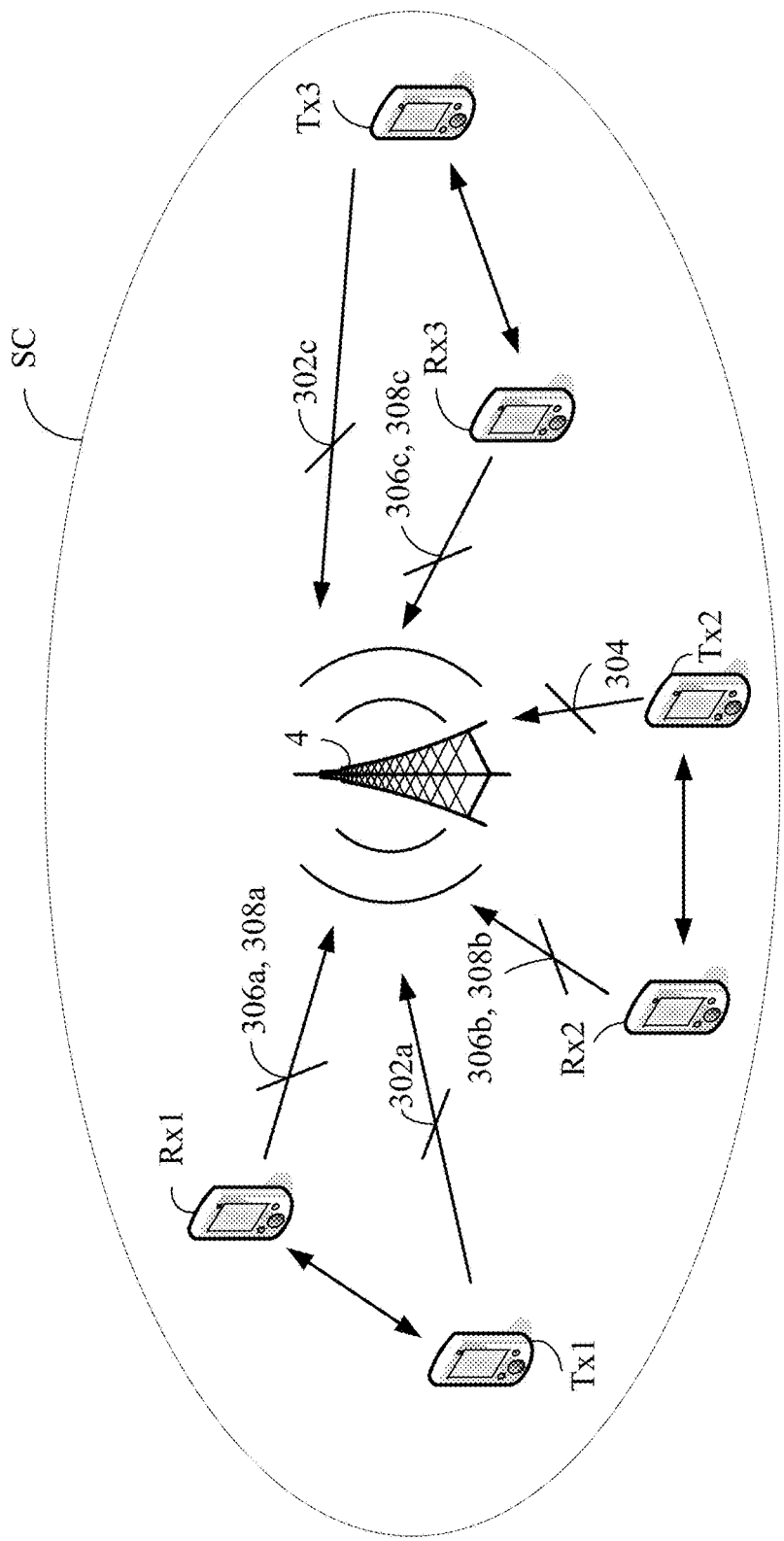
FIG. 3 is a schematic view depicting how a base station 4 of the present invention receives report messages transmitted by D2D UEs.

As shown in FIG. 3, transmitting ends (i.e., D2D UEs Tx1, Tx2, Tx3) within signal coverage SC of the base station 4 can know the first transmission mode resource and the second transmission mode resource from the broadcasting message 102 (carrying the second transmission mode information M2) broadcasted by the base station 4 and the resource configuration message 106 (carrying the first transmission mode information M1) unicasted or multicasted by the base station 4. Therefore, the D2D UEs Tx1, Tx2, Tx3 can utilize the first transmission mode resource and/or the second transmission mode resource to perform D2D data transmission with the receiving ends (i.e., D2D UEs Rx1, Rx2, Rx3).

Figure 4A:
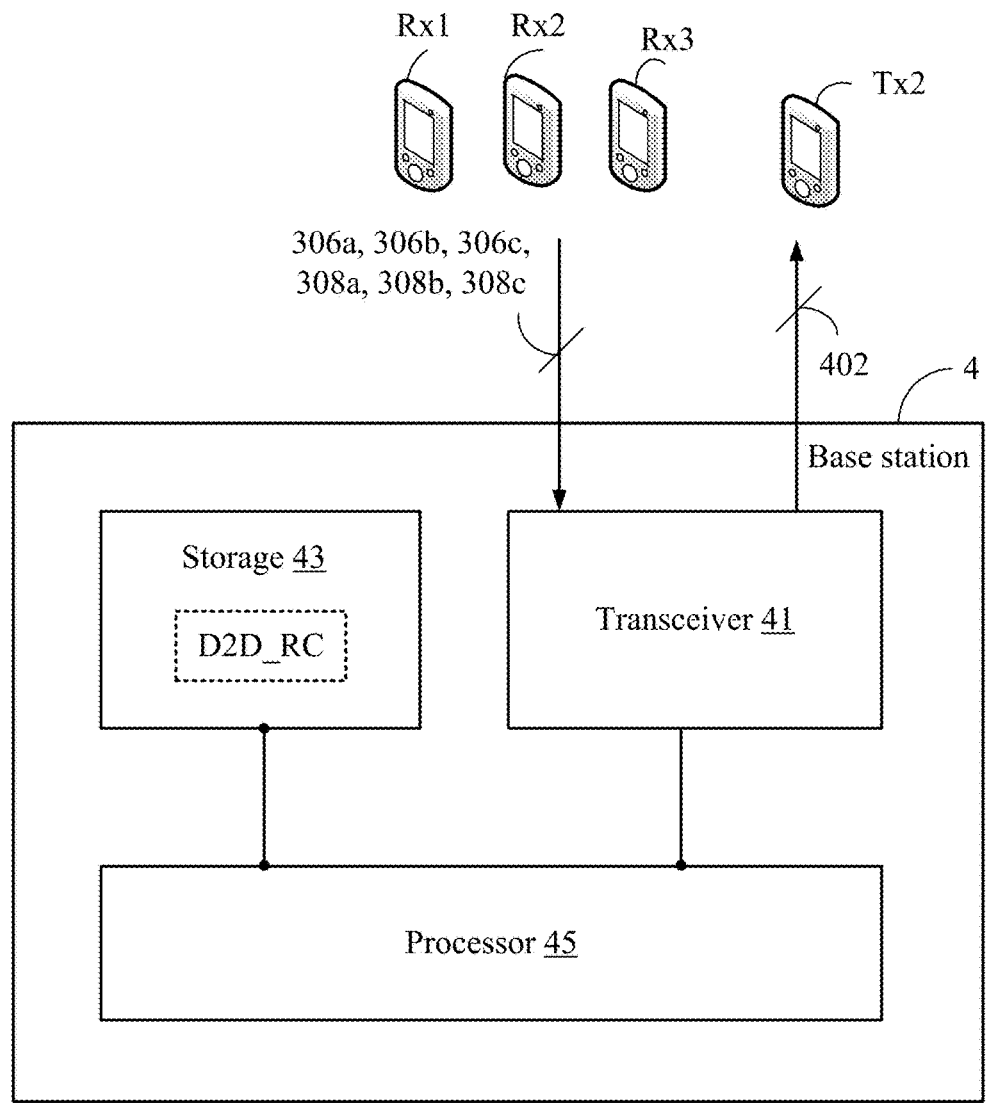
FIG. 4A is a schematic view of the base station 4 according to a sixth and a seventh embodiment of the present invention.

Specifically, as shown in FIG. 4A, the base station 4 comprises a transceiver 41, a storage 43 and a processor 45. The processor 45 is electrically connected to the transceiver 41 and the storage 43. The storage 43 is configured to store a D2D resource configuration D2D_RC. It shall be noted that, each of the transmitting ends transmits a request message or a contention report message to the base station according to a respective D2D transmission demand respectively. For example, as shown in FIG. 3, the D2D UEs Tx1 and Tx3 are to perform D2D data transmissions in the first transmission mode, so the D2D UEs Tx1 and Tx3 transmit a request message 302*a* and a request message 302*c* to the base station respectively; and the D2D UE Tx2 is to perform a D2D data transmission in the second transmission mode, so the D2D UE Tx2 tries to contend for a resource from the resource pool and, according to the contention result, transmits a contention report message 304 to the base station 4. Similarly, upon receiving the request messages 302*a* and 302*c*, the base station 4 schedules appropriate D2D resources (i.e., the first transmission mode resources) for use by the D2D UEs Tx1 and Tx3 according to the requested D2D resources in the request messages 302*a* and 302*c*.

Figure 4B:
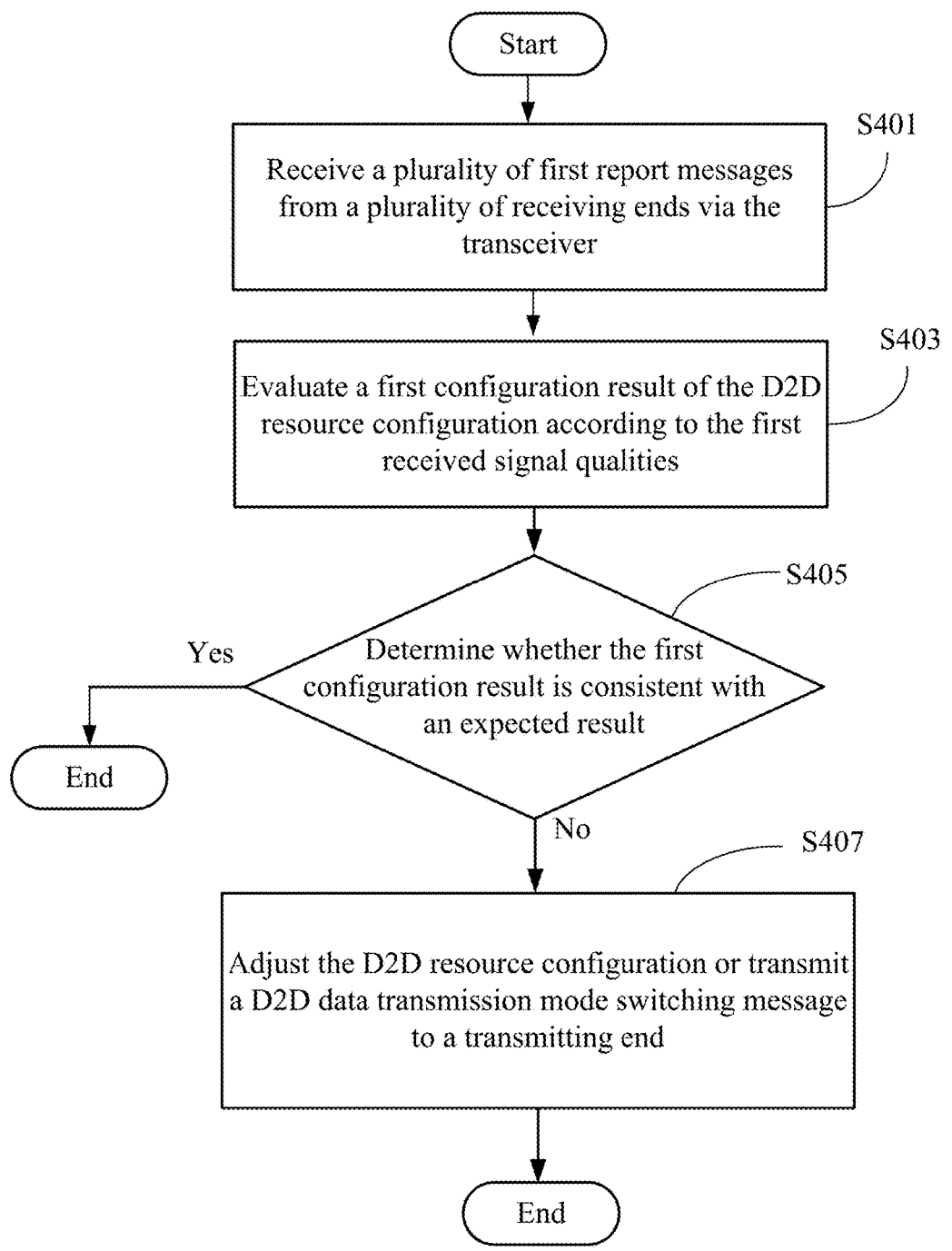
FIG. 4B is a flowchart diagram of a resource adjustment method according to the sixth embodiment of the present invention.

In this embodiment, the processor 45 executes a resource adjustment method as shown in FIG. 4B. Firstly, step S401 is executed by the processor 45 to receive a plurality of first report messages from a plurality of receiving ends via the transceiver 41. Each of the first report messages indicates a first received signal quality of one of the receiving ends, and each of the receiving ends is a D2D UE. For example, as shown in FIG. 3 and FIG. 4A, the base station 4 receives first report messages 306*a*, 306*b*, 306*c* from the D2D UEs Rx1, Rx2, Rx3 respectively. The first report message 306*a* indicates a first received signal quality presented when the D2D UE Rx1 and the D2D UE Tx1 perform D2D communications therebetween. The first report message 306*b* indicates a first received signal quality presented when the D2D UE Rx2 and the D2D UE Tx2 perform D2D communications therebetween. The first report message 306*c* indicates a first received signal quality presented when the D2D UE Rx3 and the D2D UE Tx3 perform D2D communications therebetween.

Then, step S403 is executed by the processor 45 to evaluate a first configuration result of the D2D resource configuration according to the first received signal qualities. Next, step S405 is executed to determine whether the first configuration result is consistent with an expected result. If the first configuration result is inconsistent with the expected result, then step S407 is executed by the processor 45 to adjust the D2D resource configuration scheduled by the base station or transmit a D2D data transmission mode switching message to a transmitting end, wherein the transmitting end is a D2D UE that transmits D2D data to one of the receiving ends (e.g., the D2D UEs Tx1, Tx2, Tx3 shown in FIG. 3). For example, if the first report message 306*b* received by the base station 4 from the D2D UE Rx2 indicates that the first received signal quality of the D2D communication between the D2D UE Rx2 and the D2D UE Tx2 is poor and the first report message 306*c* indicates that the first received signal quality of the D2D communication between the D2D UE Rx3 and the D2D UE Tx3 is also poor, then the base station 4 may re-schedule the D2D resources to adjust the resource configuration.

In another implementation as shown in FIG. 4A, the base station 4 may also transmit a D2D data transmission mode switching message 402 to the D2D UE Tx2 so that the D2D UE Tx2 switches from the second transmission mode to the first transmission mode according to the D2D data transmission mode switching message 402. In other words, the D2D data transmission mode switching message 402 is configured to instruct the transmitting end to switch between the first transmission mode and the second transmission mode for D2D data transmission. Accordingly, the D2D UE Tx2 switches from the second transmission mode to the first transmission mode according to the D2D data transmission mode switching message 402 so as to use the first transmission mode resource for D2D data transmission.

Figure 5A:
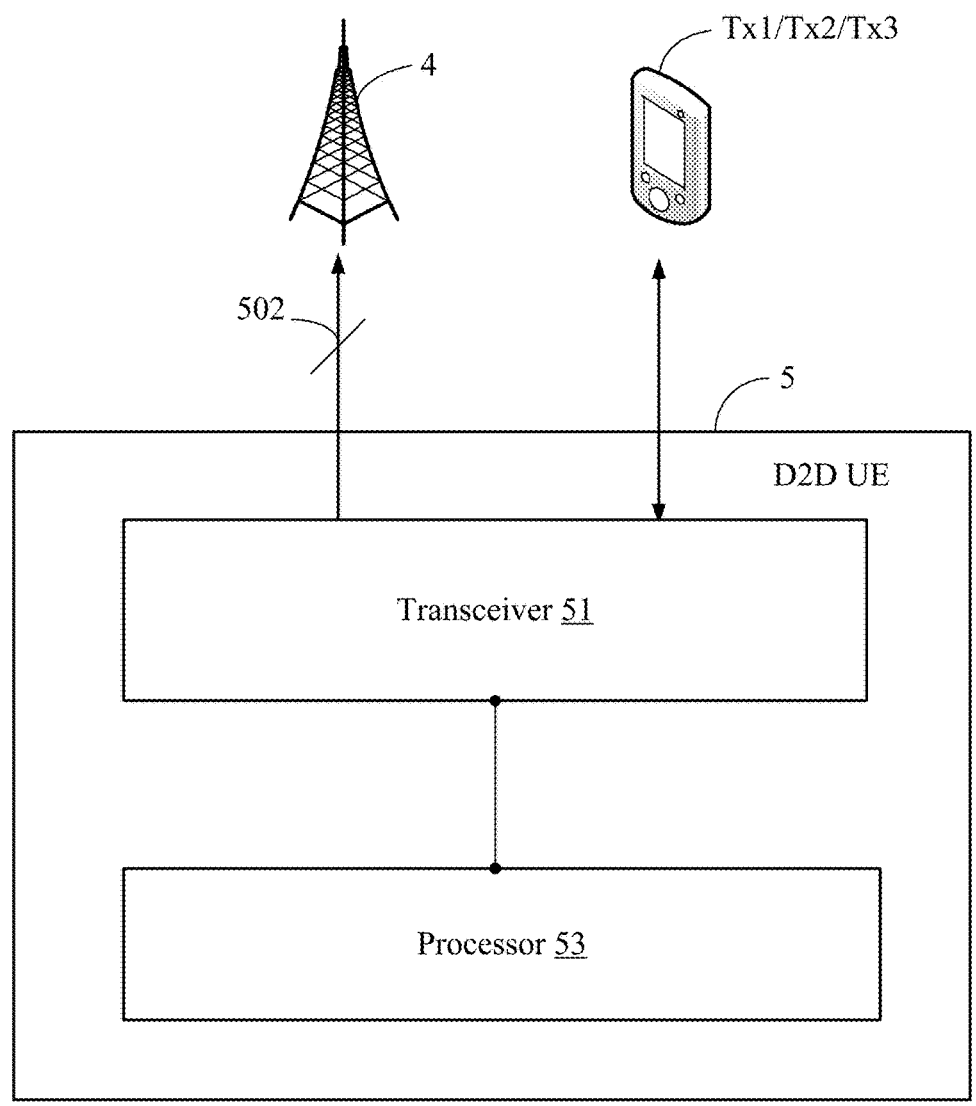
FIG. 5A is a schematic view of a D2D UE 5 according to the sixth embodiment of the present invention.
Figure 5B:
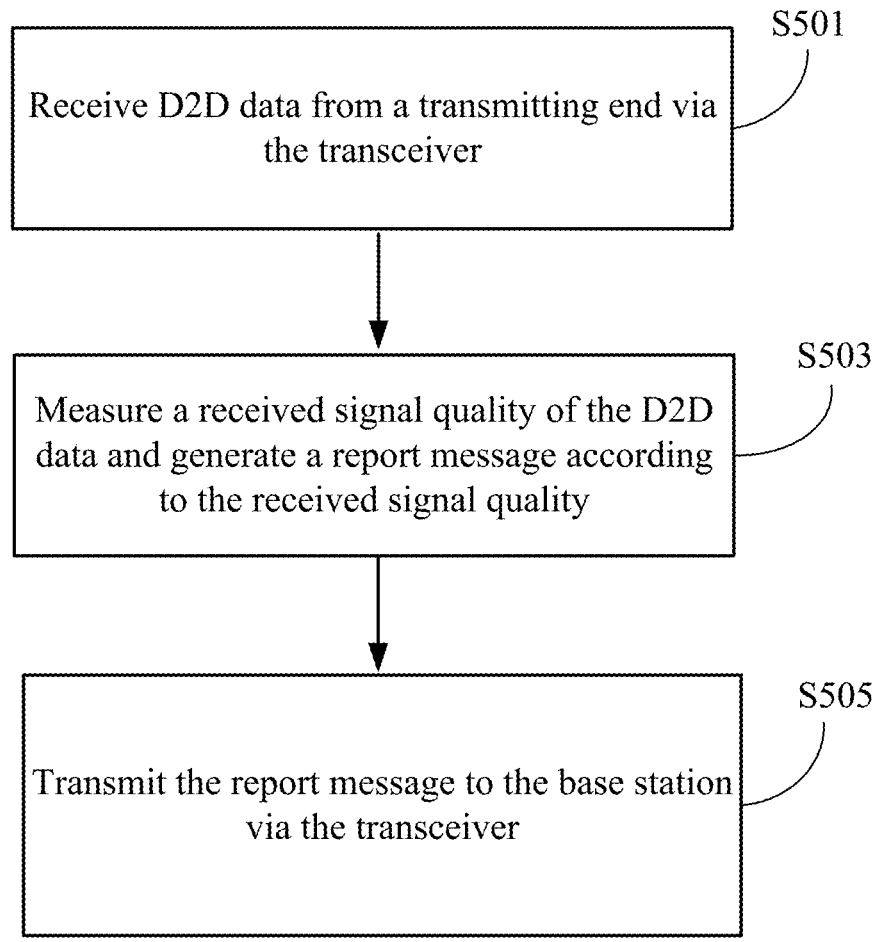
FIG. 5B is a flowchart diagram of a report method according to the sixth embodiment of the present invention.

FIG. 5A is a schematic view of a D2D UE 5 (e.g., any of the D2D UEs Rx1, Rx2, Rx3). The D2D UE 5 performs message transmissions with the base station 4 and a transmitting end (e.g., any of the D2D UEs Tx1, Tx2, Tx3). Because report messages are transmitted by a plurality of receiving ends to report their respective received signal qualities so that the base station 4 can appropriately adjusts the D2D resource configuration in the resource adjustment method of this embodiment, a report method must be executed by the receiving end (the D2D UE 5) in this embodiment. The D2D UE 5 comprises a transceiver 51 and a processor 53. The processor 53 is electrically connected to a transceiver 51. The processor 53 is configured to execute the report method shown in FIG. 5B when the D2D UE 5 operates as a receiving end.

Firstly, step S501 is executed to receive D2D data from a transmitting end via the transceiver 51, wherein the transmitting end is another D2D UE (e.g., one of the D2D UEs Tx1, Tx2, Tx3). Then, step S503 is executed to measure a received signal quality of the D2D data and generate a report message 502 according to the received signal quality. Finally, step S505 is executed to transmit the report message 502 to the base station 4 via the transceiver 51. It shall be understood that, the base station 4 of this embodiment continuously receives report messages from the receiving ends and periodically executes the resource adjustment method (the period may be dynamically adjusted depending on the resource utilization rate) so that the D2D resource configuration is adjusted timely. In this way, the resource adjustment method of this embodiment can improve the resource band utilization efficiency and improve the D2D data transmission quality of the D2D UEs.

Figure 6A:
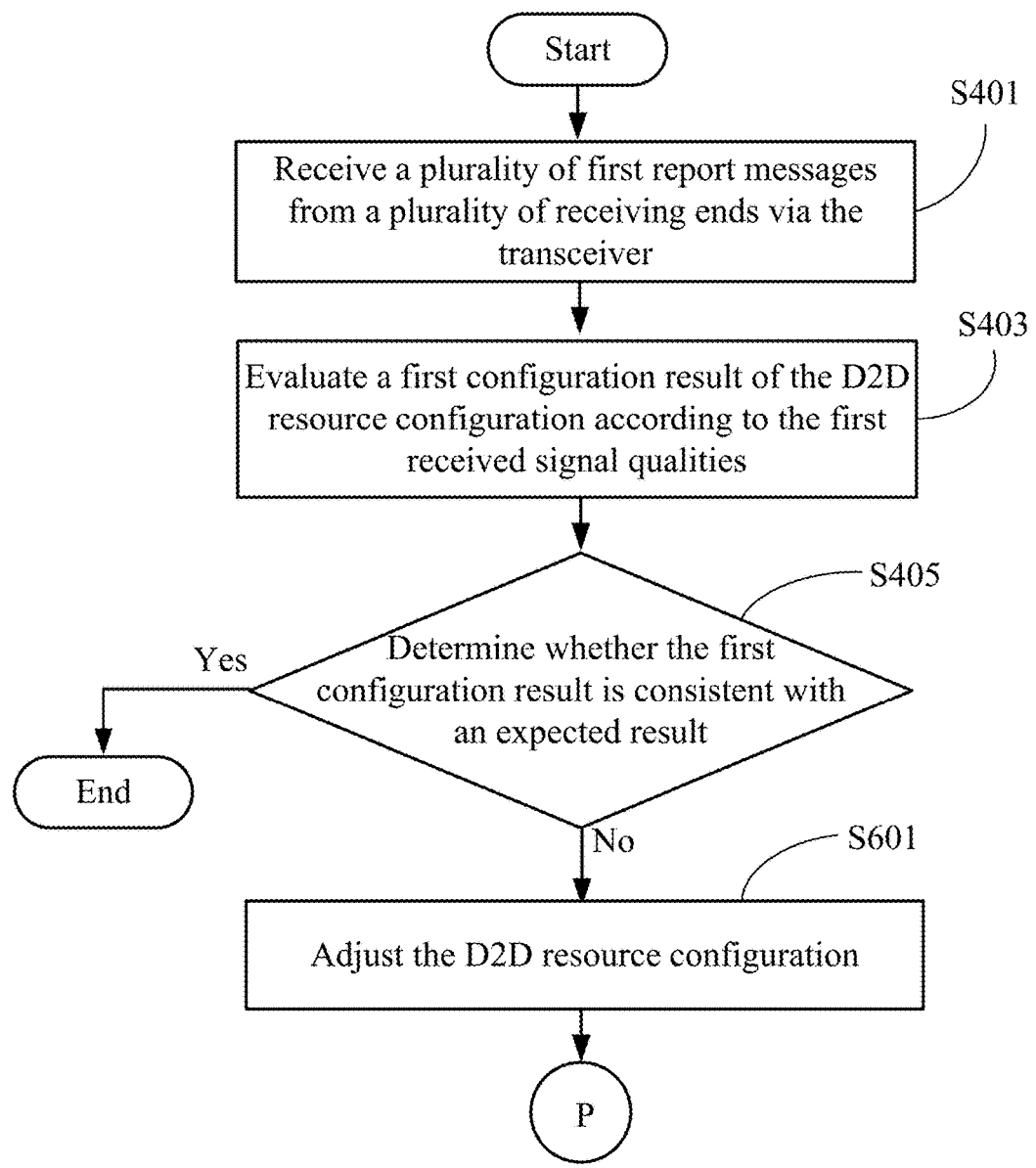
FIGS. 6A and 6B are flowchart diagrams of a resource adjustment method according to the seventh embodiment of the present invention.
Figure 6B:
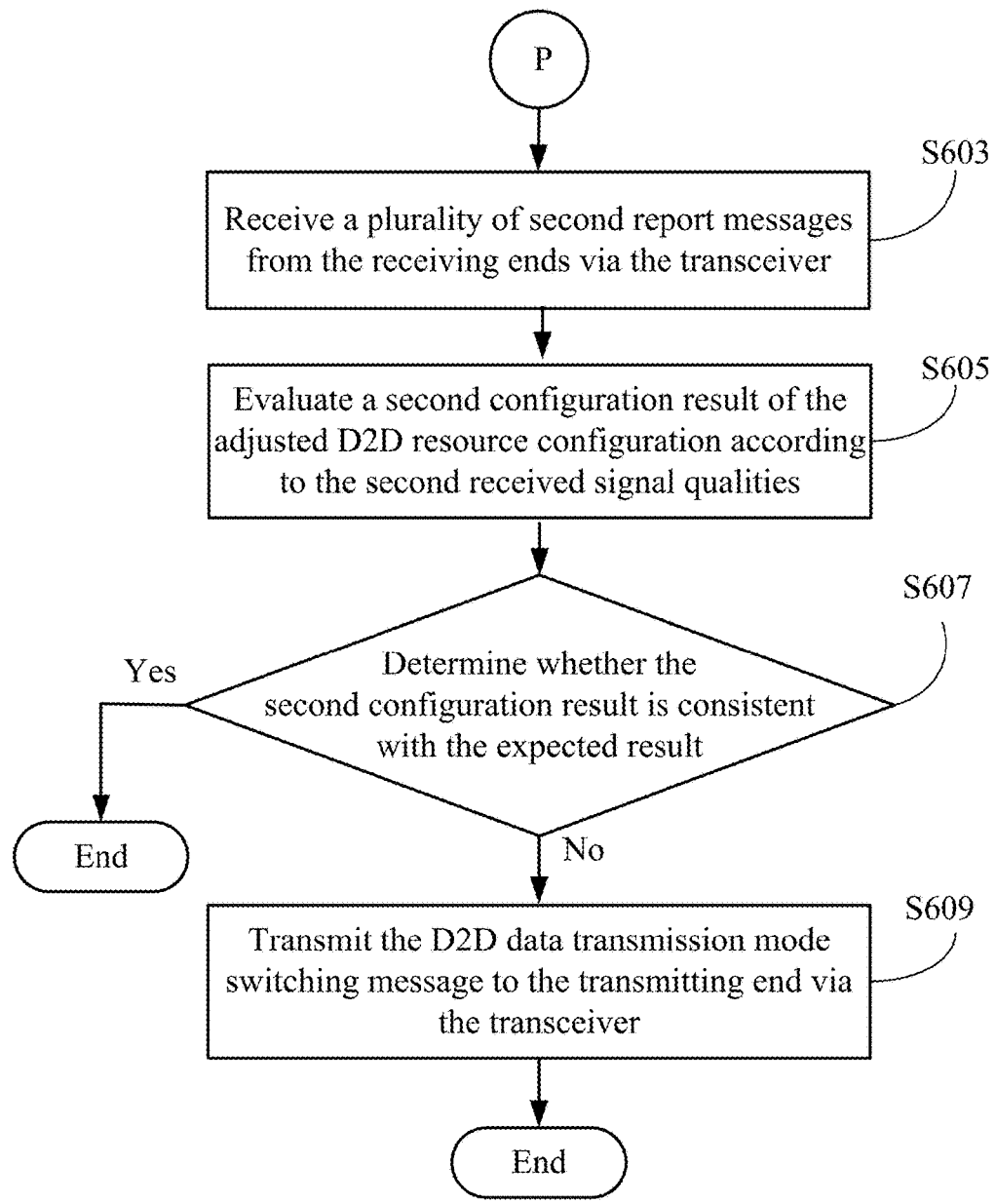

Please refer to FIGS. 3, 4A, 6A and 6B for a seventh embodiment of the present invention. In this embodiment, as shown in FIG. 6A, firstly step S601 is executed by the processor 45 of the base station 4 to adjust the D2D resource configuration when the first configuration result in inconsistent with the expected result. Then as shown in FIG. 6B, step S603 is executed by the processor 45 to receive a plurality of second report messages from the receiving ends via the transceiver 41, where each of the second report messages indicates a second received signal quality of one of the receiving ends. For example, the base station 4 receives the second report messages 308a, 308b, 308c from the D2D UEs Rx1, Rx2, Rx3 respectively, as shown in FIG. 3 and FIG. 4A. Similarly, the second report message 308a is configured to indicate a second received signal quality of the D2D UE Rx1 after the D2D resource configuration has been adjusted; the second report message 308b is configured to indicate a second received signal quality of the D2D UE Rx2 after the D2D resource configuration has been adjusted; and the second report message 308c is configured to indicate a second received signal quality of the D2D UE Rx3 after the D2D resource configuration has been adjusted.

Afterwards, step S605 is executed by the processor 45 to evaluate a second configuration result of the adjusted D2D resource configuration according to the second received signal qualities. Then, step S607 is executed by the processor 45 to determine whether the second configuration result is consistent with the expected result. When the second configuration result is inconsistent with the expected result, then step S609 is executed by the processor 45 to transmit the D2D data transmission mode switching message 402 to the transmitting end via the transceiver 41. For example, if the second report message 308b indicates that the received signal quality of the D2D UE Rx2 is still poor after the D2D resource configuration has been adjusted, the base station 4 transmits the D2D data transmission mode switching message 402 to the D2D UE Tx2 so that the D2D UE Tx2 switches from the second transmission mode to the first transmission mode according to the D2D data transmission mode switching message 402 so as to use the first transmission mode resource for D2D data transmission.

Similarly, the base station 4 of this embodiment also continuously receives report messages from the receiving ends and periodically executes the resource adjustment method (the period may be dynamically adjusted depending on the resource utilization rate) so that the D2D resource configuration is adjusted timely. In this way, the resource adjustment method of this embodiment can improve the resource band utilization efficiency and improve the D2D data transmission quality of the D2D UEs. It shall be additionally appreciated that, the term "first" used in the first report messages described herein is only used to represent report messages firstly received (i.e., report messages before adjustment of the D2D resource configuration) each time the resource adjustment method is executed, and the term "second" used in the second report messages is used to represent report messages received after adjustment of the D2D resource configuration.

Figure 7A:
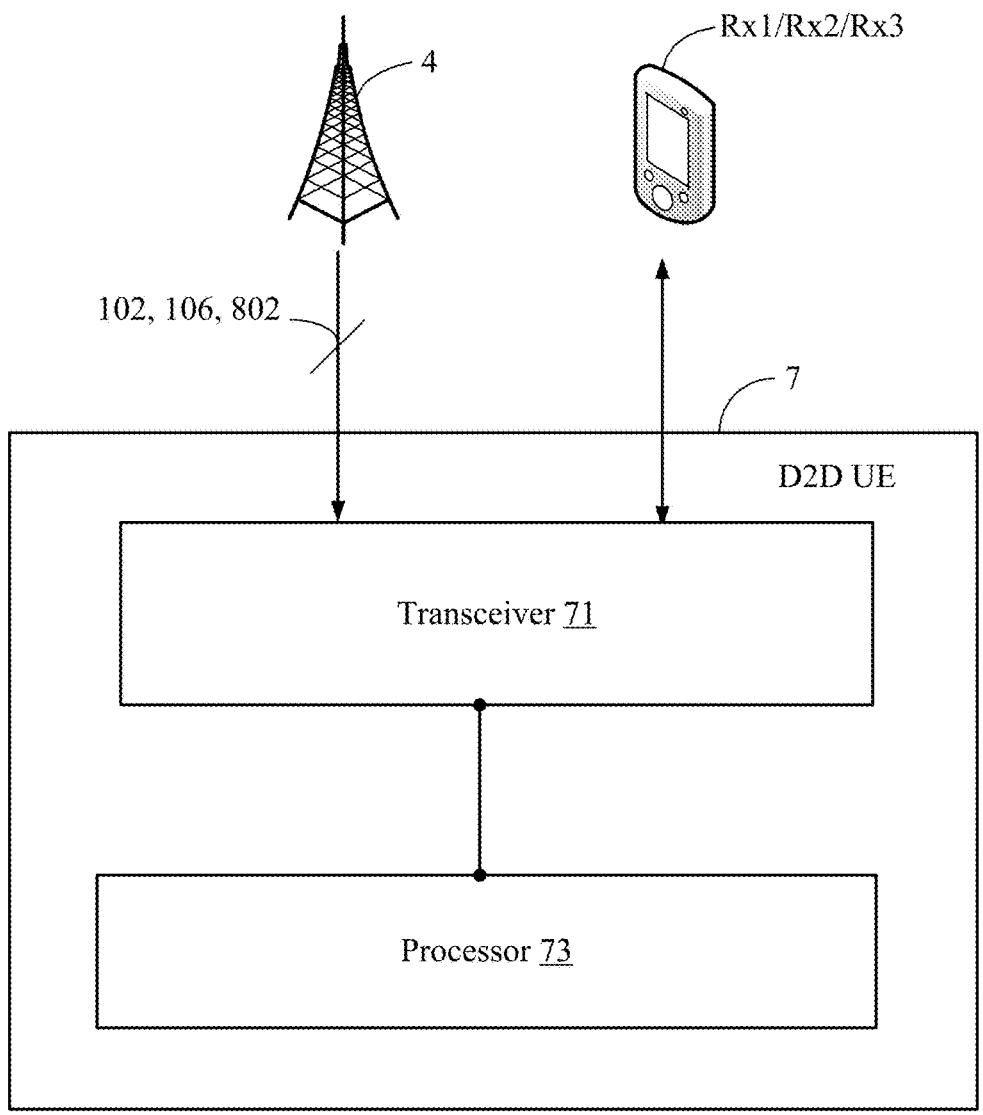
FIG. 7A is a schematic view of a D2D UE 7 according to an eighth to a tenth embodiment of the present invention.
Figure 7B:
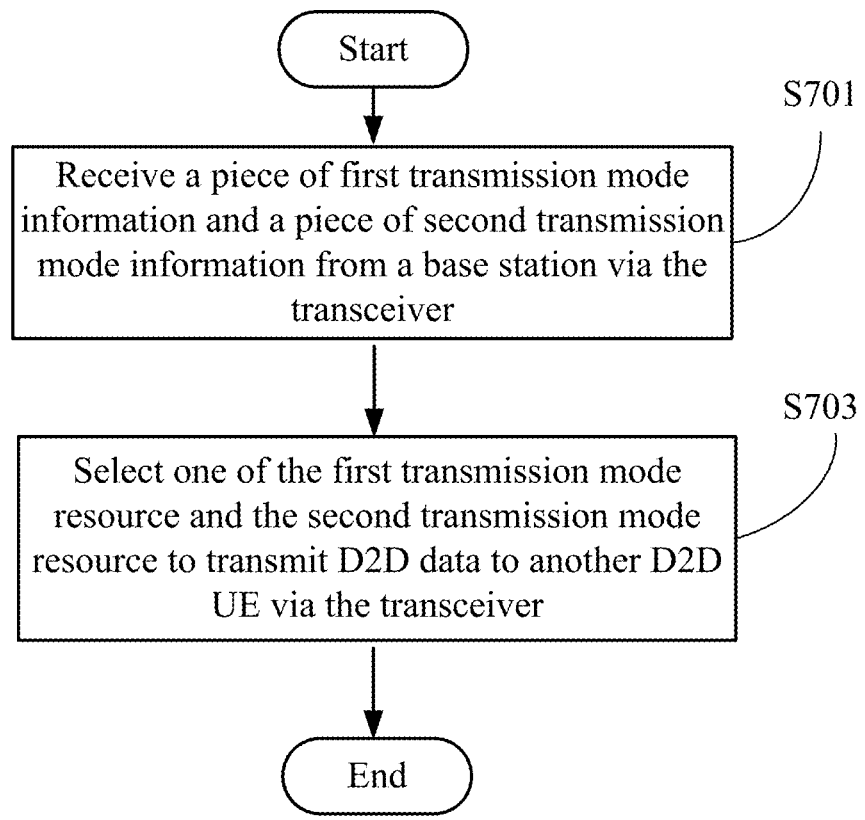
FIG. 7B is a flowchart diagram of a transmission method according to the eighth embodiment of the present invention.

An eighth embodiment of the present invention is shown in FIG. 7A and FIG. 7B, which depict schematic views of D2D data transmissions performed by a D2D UE 7. As shown in FIG. 7A, the D2D UE 7 comprises a transceiver 71 and a processor 73. The processor 73 is electrically connected to the transceiver 71. The processor 73 is configured to execute a transmission method shown in FIG. 7B when the D2D UE 7 operates as a transmitting end (e.g., one of the D2D UEs Tx1, Tx2, Tx3).

Firstly, step S701 is executed to receive a piece of first transmission mode information M1 and a piece of second transmission mode information M2 from a base station 4 via the transceiver 71. As previously described, the first transmission mode information indicates a first transmission mode resource, and the second transmission mode information indicates a second transmission mode resource. Then, step S703 is executed to select one of the first transmission mode resource and the second transmission mode resource to transmit D2D data to another D2D UE (e.g., one of the D2D UEs Rx1, Rx2, Rx3) via the transceiver 71.

Figure 7C:
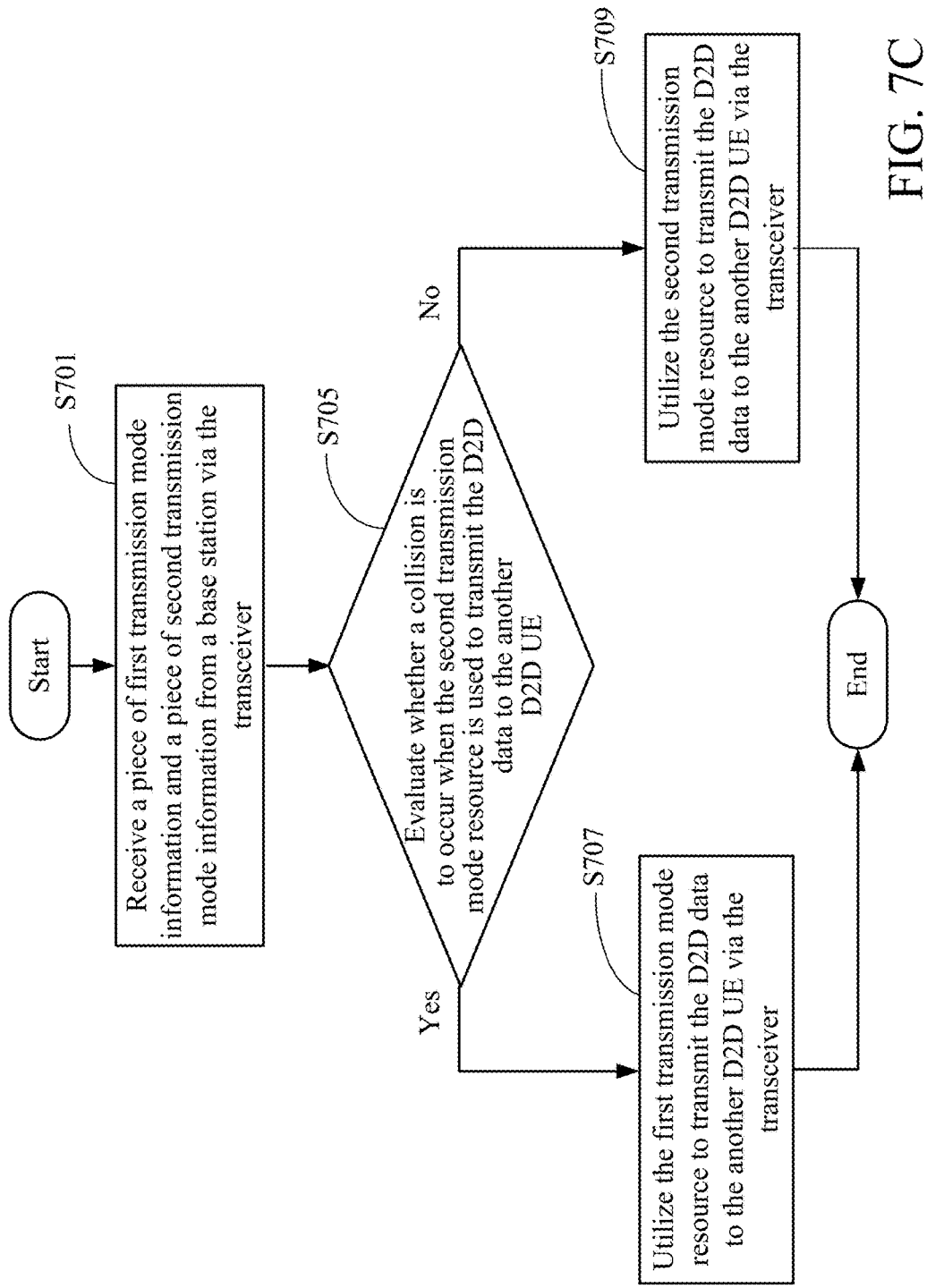
FIG. 7C is a flowchart diagram of a transmission method according to the ninth embodiment of the present invention.

A ninth embodiment of the present invention is as shown in FIG. 7A and FIG. 7C, which is an extension of the eighth embodiment. In this embodiment, the D2D UE 7 further selects one of the first transmission mode resource and the second transmission mode resource for D2D data transmission according to the transmission condition. Specifically, as shown in FIG. 7C, after receiving a piece of first transmission mode information and a piece of second transmission mode information, step S705 is executed by the processor 73 to evaluate whether a collision is to occur when the second transmission mode resource is utilized to transmit the D2D data to the another D2D UE. When it is evaluated that the collision is to occur, then step S707 is executed by the processor 73 to utilize the first transmission mode resource to transmit the D2D data to the another D2D UE via the transceiver 71. Otherwise, when it is evaluated that the collision is not to occur, then step S709 is executed to utilize the second transmission mode resource to transmit the D2D data to the another D2D UE via the transceiver 71.

Thus, when it is determined by the D2D UE 7 that the collision is not to occur in use of the second transmission mode resource, the second transmission mode resource is used for D2D data transmission without having to request the first transmission mode resource from the base station 4. Thereby, the transmission mechanism of this embodiment can ease the scheduling burden of the base station. Besides, in other embodiments, the first transmission mode resource may be a licensed band resource, and the second transmission mode resource may be an unlicensed band resource. Thus, when it is determined by the D2D UE 7 that using the unlicensed band resource for D2D communication will not cause a collision, the unlicensed band resource may be used for D2D data transmission so that the base station 4 is able to allocate the licensed band resource that is saved to other D2D UEs, thus improving the band utilization efficiency.

Figure 8:
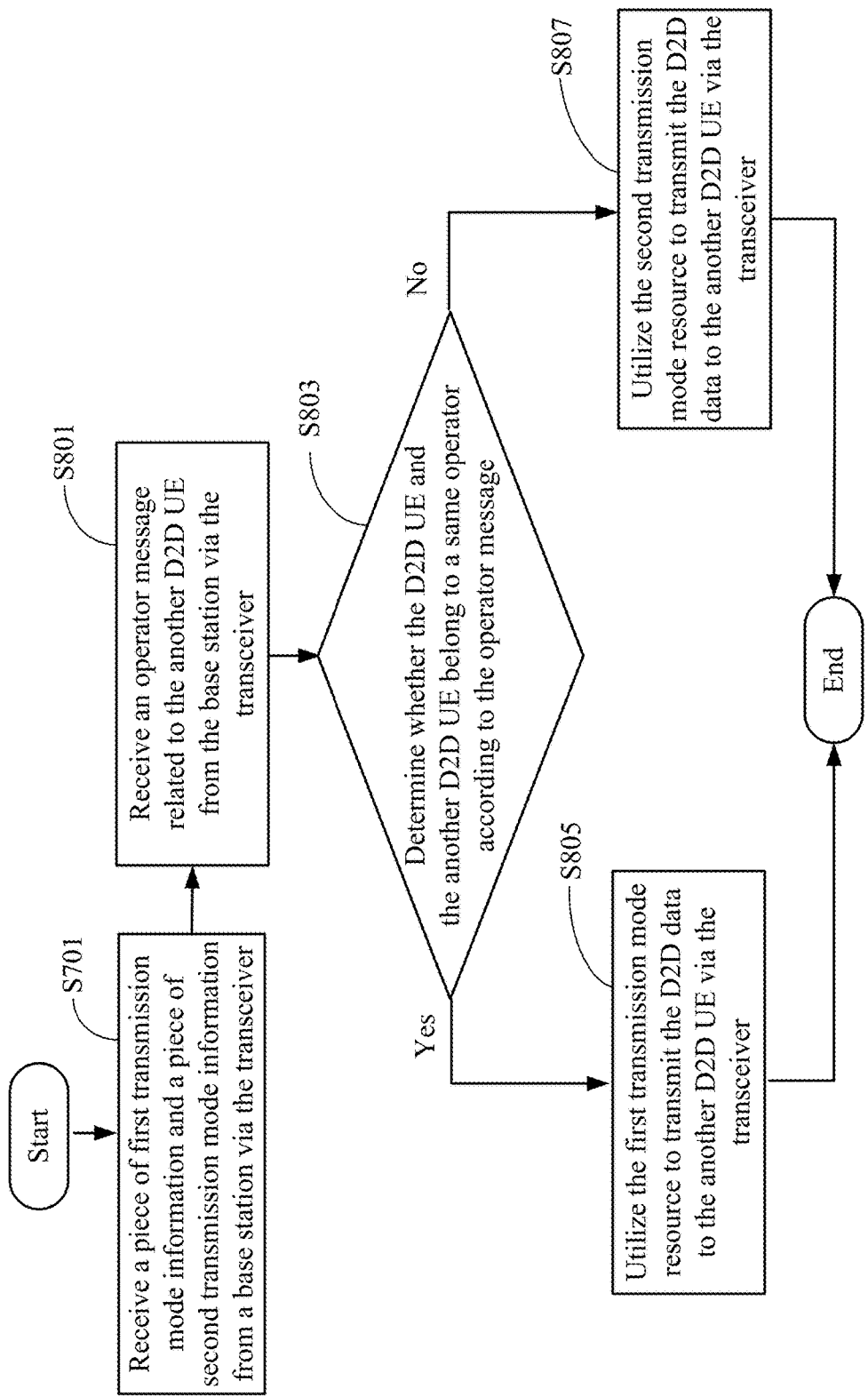
FIG. 8 is a flowchart diagram of a transmission method according to the tenth embodiment of the present invention.

Please refer to FIG. 7A and FIG. 8 together for a tenth embodiment of the present invention, which is also an extension of the eighth embodiment. In this embodiment, the D2D UE 7 selects one of the first transmission mode resource and the second transmission mode resource according to telecommunication operators to which the receiving ends belong. Additionally, it is assumed in this embodiment that the first transmission mode resource is a licensed band resource, and the second transmission mode resource is an unlicensed band resource. Specifically, as shown in FIG. 7A and FIG. 8, step S701 is executed by the processor 73 to receive a piece of first transmission mode information and a piece of second transmission mode information from the base station 4 via the transceiver 71. Then, step S801 is executed to receive an operator message 802 related to the another D2D UE from the base station 4 via the transceiver 71.

Afterwards, step S803 is executed by the processor 73 to determine whether the D2D UE 7 and the another D2D UE belong to a same operator according to the operator message 802. When the D2D UE 7 and the another D2D UE belong to a same operator, then step S805 is executed by the processor 73 to utilize the first transmission mode resource to transmit the D2D data to the another D2D UE via the transceiver 71. Otherwise, when the D2D UE 7 and the another D2D UE don't belong to a same operator, then step S807 is executed to utilize the second transmission mode resource to transmit the D2D data to the another D2D UE via the transceiver 71.

As an example, it is assumed that the D2D UE 7 belongs to a first telecommunication operator, and the another D2D UE belongs to a second telecommunication operator. The first telecommunication operator provides a first licensed band resource, and the second telecommunication operator provides a second licensed band resource. Because it is impossible for both the D2D UE 7 and the another D2D UE to use the first licensed band resource for D2D data transmission, the D2D UE 7 preferentially use the unlicensed band resource (i.e., the second transmission mode resource) to perform the D2D data transmission with the another D2D UE when the D2D UE 7 and the another D2D UE belong to different operators.

According to the above descriptions, the transmission adjustment mechanism of the present invention allows a D2D UE to utilize both the first transmission mode resource and the second transmission mode resource to perform a D2D data transmission in case of an RLF, so the D2D data transmission modes can be adjusted depending on the service scenarios so as to improve the resource band utilization efficiency. Additionally, with the resource configuration adjustment and transmission mode adjustment mechanism of the present invention, the base station can adjust the D2D resource configuration or instruct the transmitting end to switch the transmission mode in real time by receiving report messages from the receiving ends, so the quality of D2D data transmission between the D2D UEs can be improved. On the other hand, the D2D UE may further decide a transmission mode to be used according to telecommunication operators to which the receiving ends belong or according to usage conditions of the second transmission mode resource (i.e., whether a collision occurs). Thereby, the present invention allows the D2D UE to dynamically adjust the transmission mode by itself and allows the base station to dynamically adjust the resource configuration or instruct the D2D UE to adjust the transmission mode.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A device to device (D2D) user equipment (UE) for a wireless communication system, comprising:
   a storage, being configured to store a piece of first transmission mode information and a piece of second transmission mode information, the first transmission mode information indicating a first transmission mode resource and the second transmission mode information indicating a second transmission mode resource;
   a transceiver; and
   a processor electrically connected to the storage and the transceiver, being configured to execute the following operations when the D2D UE operates as a transmitting end:
      utilizing the first transmission mode resource to perform a D2D data transmission via the transceiver in a first transmission mode;
      determining whether a radio link failure (RLF) occurs between the D2D UE and a base station; and
      utilizing the first transmission mode resource and the second transmission mode resource to perform the D2D data transmission via the transceiver when the RLF occurs between the D2D UE and the base station;
   wherein the first transmission mode resource is a specific resource scheduled by the base station and the second transmission mode resource is a pre-configured and/or quasi-statically configured contention resource pool.

2. The D2D UE of claim 1, wherein the processor is further configured to execute the following operations:
   continuously utilizing the first transmission mode resource to perform the D2D data transmission via the transceiver during a buffering time period when the RLF occurs between the D2D UE and the base station; and
   utilizing the first transmission mode resource and the second transmission mode resource to perform the D2D data transmission via the transceiver after the buffering time period.

3. The D2D UE of claim 2, wherein the processor is further configured to execute the following operations:
   determining that a collision occurs when the first transmission mode resource is being utilized to perform the D2D data transmission; and
   switching to a second transmission mode and utilizing only the second transmission mode resource to perform the D2D data transmission via the transceiver after occurrence of the collision.

4. The D2D UE of claim 1, wherein the processor is further configured to execute the following operations:
   switching to a second transmission mode and, within a buffering time period, utilizing the second transmission mode resource to perform the D2D data transmission via the transceiver when the RLF occurs between the D2D UE and the base station; and utilizing the first transmission mode resource and the second transmission mode resource to perform the D2D data transmission via the transceiver after the buffering time period.

5. The D2D UE of claim 4, wherein the processor is further configured to execute the following operations:
determining that a collision occurs when the first transmission mode resource is being utilized to perform the D2D data transmission; and
utilizing only the second transmission mode resource to perform the D2D data transmission via the transceiver after occurrence of the collision.

6. The D2D UE of claim 1, wherein the processor receives a broadcasting message and a resource configuration message from the base station via the transceiver, the broadcasting message carries the second transmission mode information therein, and the resource configuration message carries the first transmission mode information therein.

7. The D2D UE of claim 6, wherein the resource configuration message further carries a piece of second transmission mode resource update information therein, and the processor further updates the second transmission mode information according to the second transmission mode resource update information.

8. The D2D UE of claim 6, wherein the processor further receives a second transmission mode update message from the base station via the transceiver, the second transmission mode update message carries a piece of second transmission mode resource update information therein, and the processor further updates the second transmission mode information according to the second transmission mode resource update information.

9. A transmission method for use in a D2D UE, the D2D UE operating as a transmitting end and comprising a storage, a transceiver and a processor, the storage storing a piece of first transmission mode information and a piece of second transmission mode information, the first transmission mode information indicating a first transmission mode resource, the second transmission mode information indicating a second transmission mode resource, the processor being electrically connected to the storage and the transceiver, and the D2D data transmission method being executed by the processor, the method comprising:
utilizing the first transmission mode resource to perform a D2D data transmission via the transceiver in a first transmission mode;
determining whether an RLF occurs between the D2D UE and a base station; and
utilizing the first transmission mode resource and the second transmission mode resource to perform the D2D data transmission via the transceiver when the RLF occurs between the D2D UE and the base station;
wherein the first transmission mode resource is a specific resource scheduled by the base station and the second transmission mode resource is a pre-configured and/or quasi-statically configured contention resource pool.

10. A base station for a wireless communication system, comprising:
a transceiver;
a storage, being configured to store a D2D resource configuration; and
a processor electrically connected to the storage and the transceiver, being configured to execute the following operations:
receiving a plurality of first report messages from a plurality of receiving ends via the transceiver, each of the first report messages indicating a first received signal quality of one of the receiving ends, and each of the receiving ends being a D2D UE;
evaluating a first configuration result of the D2D resource configuration according to the first received signal qualities;
determining whether the first configuration result is consistent with an expected result; and
adjusting the D2D resource configuration or transmitting a D2D data transmission mode switching message to a transmitting end when the first configuration result is inconsistent with the expected result, wherein the transmitting end is a D2D UE and transmits D2D data to one of the receiving ends.

11. The base station of claim 10, wherein the processor is further configured to execute the following operations:
adjusting the D2D resource configuration when the first configuration result is inconsistent with the expected result;
receiving a plurality of second report messages from the receiving ends via the transceiver, each of the second report messages indicating a second received signal quality of one of the receiving ends;
evaluating a second configuration result of the adjusted D2D resource configuration according to the second received signal qualities;
determining whether the second configuration result is consistent with the expected result; and
transmitting the D2D data transmission mode switching message to the transmitting end via the transceiver when the second configuration result is inconsistent with the expected result.

12. The base station of claim 10, wherein the D2D data transmission mode switching message is configured to instruct the transmitting end to switch between a first transmission mode and a second transmission mode to transmit the D2D data.

13. A resource adjustment method for use in a base station, the base station comprising a storage, a transceiver and a processor, the storage being configured to store a D2D resource configuration, the processor being electrically connected to the storage and the transceiver, and the resource adjustment method being executed by the processor, the method comprising:
receiving a plurality of first report messages from a plurality of receiving ends via the transceiver, each of the first report messages indicating a first received signal quality of one of the receiving ends, and each of the receiving ends being a D2D UE;
evaluating a first configuration result of the D2D resource configuration according to the first receiving signal qualities;
determining whether the first configuration result is consistent with an expected result; and
adjusting the D2D resource configuration or transmitting a D2D data transmission mode switching message to a transmitting end when the first configuration result is inconsistent with the expected result, wherein the transmitting end is a D2D UE and transmits a piece of D2D data to one of the receiving ends.

14. The resource adjustment method of claim 13, further comprising:
adjusting the D2D resource configuration when the first configuration result is inconsistent with the expected result;
receiving a plurality of second report messages from the receiving ends via the transceiver, each of the second report messages indicating a second received signal quality of one of the receiving ends;
evaluating a second configuration result of the adjusted D2D resource configuration according to the second received signal qualities;
determining whether the second configuration result is consistent with the expected result; and
transmitting the D2D data transmission mode switching message to the transmitting end via the transceiver when the second configuration result is inconsistent with the expected result.

15. A device to device (D2D) user equipment (UE), comprising:
a transceiver; and
a processor electrically connected to the transceiver, being configured to execute the following operations when the D2D UE operates as a transmitting end:
receiving a piece of first transmission mode information and a piece of second transmission mode information from a base station via the transceiver, the first transmission mode information indicating a first transmission mode resource and the second transmission mode information indicating a second transmission mode resource;
evaluating whether a collision is to occur when the second transmission mode resource is utilized to transmit D2D data to another D2D UE via the transceiver;
utilizing the first transmission mode resource to transmit the D2D data to the another D2D UE via the transceiver when it is evaluated that the collision is to occur; and
utilizing the second transmission mode resource to transmit the D2D data to the another D2D UE via the transceiver when it is evaluated that the collision is not to occur.

16. A device to device (D2D) user equipment (UE), comprising:
a transceiver; and
a processor electrically connected to the transceiver, being configured to execute the following operations when the D2D UE operates as a transmitting end:
receiving a piece of first transmission mode information and a piece of second transmission mode information from a base station via the transceiver, the first transmission mode information indicating a first transmission mode resource and the second transmission mode information indicating a second transmission mode resource;
receiving an operator message related to another D2D UE from the base station via the transceiver;
determining whether the D2D UE and the another D2D UE belong to a same operator according to the operator message;
utilizing the first transmission mode resource to transmit D2D data to the another D2D UE via the transceiver when the D2D UE and the another D2D UE belong to the same operator; and
utilizing the second transmission mode resource to transmit the D2D data to the another D2D UE via the transceiver when the D2D UE and the another D2D UE don't belong to the same operator.

17. A device to device (D2D) user equipment (UE), comprising:
a transceiver; and
a processor electrically connected to the transceiver, being configured to execute the following operations when the D2D UE operates as a transmitting end:
receiving a piece of first transmission mode information and a piece of second transmission mode information from a base station via the transceiver, the first transmission mode information indicating a first transmission mode resource and the second transmission mode information indicating a second transmission mode resource; and
selecting one of the first transmission mode resource and the second transmission mode resource to transmit D2D data to another D2D UE via the transceiver;
wherein the first transmission mode resource is a licensed band resource, and the second transmission mode resource is an unlicensed band resource.

18. A D2D data transmission method for use in a D2D UE, the D2D UE operating as a transmitting end and comprising a transceiver and a processor, the processor being electrically connected to the transceiver, and the D2D data transmission method being executed by the processor, the method comprising:
receiving a piece of first transmission mode information and a piece of second transmission mode information from a base station via the transceiver, the first transmission mode information indicating a first transmission mode resource and the second transmission mode information indicating a second transmission mode resource;
evaluating whether a collision is to occur when the second transmission mode resource is being utilized by the transceiver to perform a D2D data transmission to transmit D2D data to another D2D UE;
utilizing the first transmission mode resource to perform the D2D data transmission via the transceiver when it is evaluated that the collision is to occur; and
utilizing the second transmission mode resource to perform the D2D data transmission via the transceiver when it is evaluated that the collision is not to occur.

19. A D2D data transmission method for use in a D2D UE, the D2D UE operating as a transmitting end and comprising a transceiver and a processor, the processor being electrically connected to the transceiver, and the D2D data transmission method being executed by the processor, the method comprising:
receiving a piece of first transmission mode information and a piece of second transmission mode information from a base station via the transceiver, the first transmission mode information indicating a first transmission mode resource and the second transmission mode information indicating a second transmission mode resource;
receiving an operator message related to another D2D UE from the base station via the transceiver;
determining whether the D2D UE and the another D2D UE belong to a same operator according to the operator message;
utilizing the first transmission mode resource to transmit D2D data to the another D2D UE via the transceiver when the D2D UE and the another D2D UE belong to the same operator; and
utilizing the second transmission mode resource to transmit the D2D data to the another D2D UE via the transceiver when the D2D UE and the another D2D UE don't belong to the same operator.

* * * * *